(12) United States Patent
Hasegawa et al.

(10) Patent No.: US 8,013,954 B2
(45) Date of Patent: Sep. 6, 2011

(54) LIQUID CRYSTAL DISPLAY

(75) Inventors: Masahiro Hasegawa, Osaka (JP); Akira Sakai, Osaka (JP); Ikuo Ninomiya, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/002,607

(22) PCT Filed: Oct. 8, 2009

(86) PCT No.: PCT/JP2009/067568
§ 371 (c)(1),
(2), (4) Date: Jan. 4, 2011

(87) PCT Pub. No.: WO2010/095308
PCT Pub. Date: Aug. 26, 2010

(65) Prior Publication Data
US 2011/0109850 A1     May 12, 2011

(30) Foreign Application Priority Data

Feb. 17, 2009   (JP) ................................. 2009-034405

(51) Int. Cl.
*G02F 1/1335* (2006.01)
(52) U.S. Cl. ......................................... 349/96; 349/117
(58) Field of Classification Search .................... 349/96, 349/117
See application file for complete search history.

(56) References Cited

U.S. PATENT DOCUMENTS
2010/0182546 A1 * 7/2010 Maezawa et al. ............... 349/96

FOREIGN PATENT DOCUMENTS
| JP | 2001-074935 | 3/2001 |
| JP | 2007-108592 | 4/2007 |
| JP | 2007-298958 | 11/2007 |
| JP | 2007-328217 | 12/2007 |
| JP | 2008-009388 | 1/2008 |
| JP | 2008-015307 | 1/2008 |
| JP | 2008-033250 | 2/2008 |
| JP | 2008-058980 | 3/2008 |
| WO | WO 2007116683 A1 * | 10/2007 |

OTHER PUBLICATIONS

International Search Report for PCT/JP2009/067568, mailed Nov. 17, 2009.
Written Opinion for PCT/JP2009/067568, mailed Nov. 17, 2009.

* cited by examiner

*Primary Examiner* — Michael H Caley
(74) *Attorney, Agent, or Firm* — Nixon & Vanderhye, P.C.

(57) ABSTRACT

The present invention provides a liquid crystal display that can have both sufficient front contrast ratio and front white brightness. The present invention is a liquid crystal display including: a front polarizing plate; a liquid crystal cell; a back polarizing plate; and an optical element providing a polarizing effect, the components being arranged in the stated order, wherein the back polarizing plate has a higher transmittance than the front polarizing plate, the back polarizing plate has a lower contrast than the front polarizing plate, and the optical element providing a polarizing effect has a principal transmittance k1 of 80 to 86%, and a principal transmittance k2 of 2 to 8%.

13 Claims, 16 Drawing Sheets (a)

(b)

LIQUID CRYSTAL DISPLAY

This application is the U.S. national phase of International Application No. PCT/JP2009/067568, filed 8 Oct. 2009, which designated the U.S. and claims priority to Japanese Patent Application No. 2009-034405, filed 17 Feb. 2009, the entire contents of each of which are hereby incorporated by reference.

TECHNICAL FIELD

The present invention relates to a liquid crystal display. More specifically, the present invention relates to a liquid crystal display suitable as a liquid crystal display that includes a front polarizing plate, a liquid crystal cell, a back polarizing plate, and an optical element providing a polarizing effect in the stated order.

BACKGROUND ART

Liquid crystal displays (hereinafter also referred to as LCDs) are elements which display characters and images with use of electro-optical characteristics of liquid crystal molecules, and are widely used for products such as cell phones, laptops, liquid crystal display TVs. LCDs usually have a liquid crystal panel having polarizing plates (a front polarizing plate and a back polarizing plate) sandwiching a liquid crystal cell. Normally black LCDs, for example, can provide black display when no voltage is applied. In recent years, higher-resolution LCDs have been produced for various applications. Accordingly, there is a demand for liquid crystal panels showing a higher contrast ratio that leads to sharper display of characters and images.

Examples of the conventional method of improving the front contrast ratio of a liquid crystal panel include a method of reducing the scatter component inside the liquid crystal cell and a method of decreasing the transmittance of polarizing plates to improve the degree of polarization. Employing the method of reducing the scatter component inside the liquid crystal cell requires non-easy measures such as a design change in the cell structure. In contrast, employing the method of decreasing the transmittance of polarizing plates to improve the degree of polarization requires only a measure of changing production conditions of the polarizing plates. This method is therefore known as a way of improving the front contrast ratio comparatively easily.

As a technique of improving the front contrast ratio, each of Patent Documents 1 to 5, for example, discloses a liquid crystal panel that has a liquid crystal cell, a first polarizing plate arranged on one side of the liquid crystal cell, and a second polarizing plate arranged on the other side of the liquid crystal cell. Here, the second polarizing plate has a higher transmittance than the first polarizing plate.

Meanwhile, with regard to a technique of adjusting the transmittances of a pair of polarizing plates, Patent Document 6 discloses a liquid crystal panel that has a liquid crystal cell, a first polarizing plate arranged on one side of the liquid crystal cell, and a second polarizing plate arranged on the other side of the liquid crystal cell. In this liquid crystal panel, the first polarizing plate has a first polarizer and a first retardation layer arranged on the liquid crystal cell side of the first polarizer; the second polarizing plate has a second polarizer and a second retardation layer arranged on the liquid crystal cell side of the second polarizer; the first retardation layer shows an index ellipsoid with a relation nx>ny≧nz; the second retardation layer shows an index ellipsoid with a relation nx=ny>nz; and a transmittance (T1) of the first polarizing plate is higher than the transmittance (T2) of the second polarizing plate.

Further, liquid crystal displays have been developed which are provided with an optical element providing a polarizing effect except polarizing plates, such as a brightness enhancing film and a wire gird polarizer. More specifically about liquid crystal displays having an optical element such as a wire grid, Patent Document 7, for example, discloses a liquid crystal display provided with a wire grid polarization optical element. This optical element has a structure with a dielectric part and an anisotropically shaped metal part produced by forming a metal membrane on a transparent, flexible substrate, and extending the substrate and the metal membrane at temperatures below the melting point of the metal membrane. Here, the short length of the structure is shorter than the wavelength of light, and the long length of the structure is longer than the wavelength of light.

[Patent Document 1]
Japanese Kokai Publication No. 2007-298958
[Patent Document 2]
Japanese Kokai Publication No. 2008-9388
[Patent Document 3]
Japanese Kokai Publication No. 2008-15307
[Patent Document 4]
Japanese Kokai Publication No. 2008-33250
[Patent Document 5]
Japanese Kokai Publication No. 2008-58980
[Patent Document 6]
Japanese Kokai Publication No. 2007-328217
[Patent Document 7]
Japanese Kokai Publication No. 2001-74935

DISCLOSURE OF INVENTION

However, in the above Patent Document 1, the liquid crystal cell has liquid crystal molecules arranged in the homogeneous alignment when no electric field exists. In such a liquid crystal cell with the homogeneous alignment, there has been room for improvement in that sufficient effect cannot be provided because the thermal fluctuation of liquid crystal molecules causes alignment disorder and thus leads to a decrease in the front contrast.

In the meantime, the methods of adjusting the transmittances of the polarizing plates, which are described in Patent Documents 2 to 5, can improve the front contrast ratio. However, the methods incidentally decrease the front white brightness at the same time because the methods create a need for decreasing the transmittances of the polarizing plates. In this respect, there has been room for improvement.

Further, the technique described in Patent Document 6 is for providing a liquid crystal display with a small amount of light leakage in an oblique direction, and is not for improving the front contrast ratio.

The present invention has been made in view of the above state of the art, and aims to provide a liquid crystal display that can have both sufficient front contrast ratio and front white brightness.

The present inventors have made various studies on liquid crystal displays that can have both sufficient front contrast ratio and front white brightness. In the studies, the present inventors have focused on optical elements providing a polarization effect (hereinafter also referred to simply as an "optical element"), such as a brightness enhancing film and a wire grid polarizer. As a result, the inventors have found that a liquid crystal display can enhance the front white brightness while maintaining the front contrast ratio when having the following configuration. In this configuration, a back polarizing plate has a higher transmittance than a front polarizing plate and has a lower contrast than the front polarizing plate, and the optical element has a principal transmittance k1 of 80 to 86%, and has a principal transmittance k2 of 2 to 8%. The inventors have found that such a liquid crystal display can solve the above problems admirably, and thereby conceived of the present invention.

That is, the present invention is a liquid crystal display including: a front polarizing plate; a liquid crystal cell; a back polarizing plate; and an optical element providing a polarizing effect, the components being arranged in the stated order, wherein the back polarizing plate has a higher transmittance than the front polarizing plate, the back polarizing plate has a lower contrast than the front polarizing plate, and the optical element providing a polarizing effect has a principal transmittance k1 of 80 to 86%, and a principal transmittance k2 of 2 to 8%.

This makes it possible to enhance the front white brightness while maintaining the front contrast ratio of the liquid crystal display. That is, both sufficient front contrast ratio and front white brightness can be achieved.

The liquid crystal display of the present invention can have any configuration as long as it includes the above components, and may or may not include other components.

Preferable embodiments of the liquid display device according to the present invention are described in detail below. The following embodiments may be appropriately combined.

At least one of the front polarizing plate and the back polarizing plate preferably has a retardation layer on the liquid crystal cell side.

The liquid crystal cell preferably has a liquid crystal layer containing liquid crystal molecules that are arranged in a homeotropic alignment in a state with no electric field.

The retardation layer is preferably a retardation film showing an index ellipsoid that satisfies nx≧ny>nz.

In terms of enhancing the contrast in an oblique viewing angle, an embodiment (hereinafter also referred to as a first embodiment) is preferable in which the back polarizing plate has a retardation layer on the liquid crystal cell side, and the liquid crystal cell has a liquid crystal layer containing liquid crystal molecules that are arranged in a homeotropic alignment in a state with no electric field.

Further, in terms of further enhancing the contrast in an oblique viewing angle, the back polarizing plate in the first embodiment preferably has a negative C plate on the side of the optical element providing a polarizing effect.

The optical element providing a polarizing effect preferably has a principal transmittance k1 of 82 to 84%.

The optical element providing a polarizing effect preferably has a principal transmittance k2 of 2 to 6%.

The front polarizing plate preferably has a transmittance of 40 to 45%.

The front polarizing plate preferably has a transmittance of 42 to 44%.

The back polarizing plate preferably has a transmittance of 42 to 48%.

The back polarizing plate preferably has a transmittance of 43 to 46%.

The optical element providing a polarizing effect is preferably a brightness enhancing film or a wire grid polarizer.

EFFECT OF THE INVENTION

The liquid crystal display of the present invention can achieve both sufficient front contrast ratio and front white brightness.

BRIEF DESCRIPTION OF DRAWINGS

FIG. 2(a) is for determining the white brightness; and FIG. 2(b) is for determining the black brightness.

MODES FOR CARRYING OUT THE INVENTION

Figure 1:
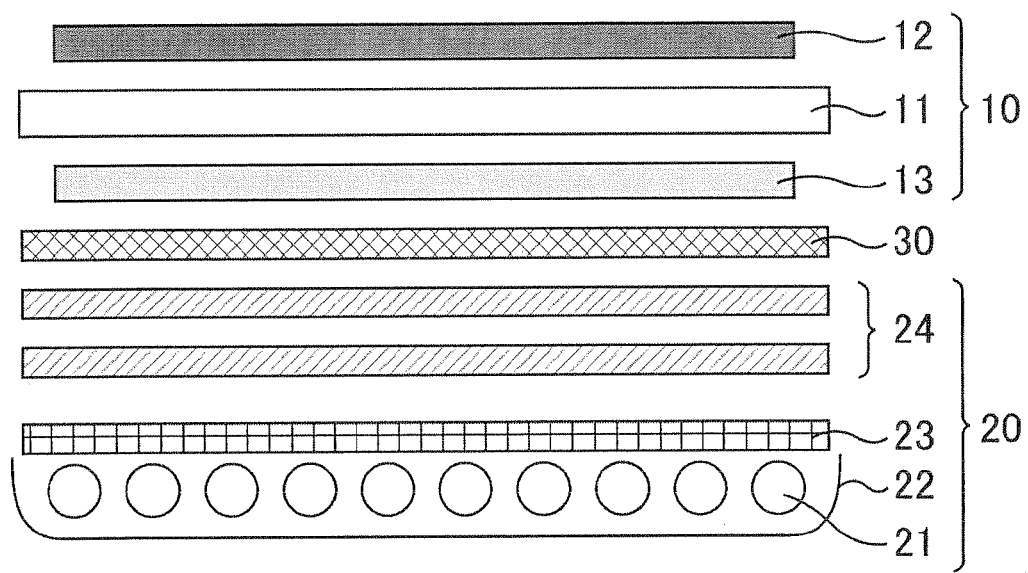
FIG. 1 is a schematic cross-sectional view of a liquid crystal display of Embodiment 1.

The present invention will be described in more detail based on the following embodiments with reference to the drawings. The present invention is not limited to these embodiments.

The transmittance herein is determined by measuring the value Y after visibility correction with a 2-degree field of view (with C light source) in accordance with JIS Z8701-1982. Examples of a measuring device include an ultraviolet-visible spectrophotometer ("V-7100" produced by the JASCO Corporation).

The degree of polarization herein is determined by measuring the parallel transmittance (Tp) and the cross transmittance (Tc) of a polarizing plate with for example the above ultraviolet-visible spectrophotometer, and then substituting the measured values in the following formula: degree of polarization (%)=$\{(Tp-Tc)/(Tp+Tc)\}^{1/2} \times 100$.

The parallel transmittance (Tp) is the value of the transmittance of a parallel laminate polarizer produced by laminating two polarizing elements of the same kind (the front polarizing plate, the back polarizing plate, or the optical element) such that the absorption axes of those elements are parallel to each other.

The parallel transmittance (Tp) is determined by the formula: $(k1^2+k2^2)/2$.

"k1" and "k2" are referred to as principal transmittances, and the principal transmittance k1 is a transmittance of a polarizing element determined when a linearly polarized light enters the polarizing element and the vibration direction of the linearly polarized light is parallel to the transmission axis of the polarizing element. The principal transmittance k2 is a transmittance of a polarizing element determined when a linearly polarized light enters the polarizing element and the vibration direction of the linearly polarized light is parallel to the absorption axis of the polarizing element.

The cross transmittance (Tc) is the value of the transmittance of a cross laminate polarizer produced by laminating two polarizing elements of the same kind (the front polarizing plate, the back polarizing plate, or the optical element) such that the absorption axes of those elements are perpendicular to each other.

The cross transmittance (Tc) is determined by the formula: k1×k2.

The principal transmittance k1 and the principal transmittance k2 herein are determined by measuring the value Y after visibility correction with a 2 degree field of view (with C light source) in accordance with JIS Z8701-1982. Examples of a measuring device include an ultraviolet-visible spectrophotometer ("V-7100" produced by the JASCO Corporation).

The contrast (CR) of a polarizing element (the front polarizing plate, the back polarizing plate, or the optical element) herein is determined by measuring the parallel transmittance (Tp) and the cross transmittance (Tc) of the polarizing element, and then substituting the measured values in the following formula: CR=Tp/Tc.

The definitions of other terms and symbols herein are given below.

(1) Principal Refractive Indices (nx, ny, nz)

"nx" represents a refractive index in the direction of the maximum in-plane refractive index (i.e., in the slow axis direction). "ny" represents a refractive index in the direction perpendicular to the slow axis in the same plane. "nz" represents a refractive index in the thickness direction.

(2) In-Plane Retardation Value

An in-plane retardation value (Re [λ]) refers to a retardation value in the plane of a film at a wavelength λ (nm) at 23° C. Re [λ] is calculated by the formula Re [λ]=(nx−ny)×d where d represents the thickness of the film (in nm)

(3) Thickness Direction Retardation Value

A thickness direction retardation value (Rth [λ]) refers to a retardation value in the thickness direction of a film at a wavelength λ (nm) at 23° C. Re [λ] is calculated by the formula Rth [λ]=(nx−nz)×d where d represents the thickness of the film (in nm).

Embodiment 1

FIG. 1 is a schematic cross-sectional view of a liquid crystal display of Embodiment 1.

The liquid crystal display of the present embodiment has a liquid crystal panel 10, and a backlight 20 arranged at the back of the liquid crystal panel 10. The backlight 20 is provided with a cold cathode tube 21, a case 22 holding the cold cathode tube 21, and a diffuser 23 and multiple optical sheets 24 arranged on the liquid crystal panel 10 side of the cold cathode tube 21. The diffuser 23 and the optical sheets 24 are arranged in this order from the cold cathode tube 21 side toward the liquid crystal panel 10 side. The liquid crystal panel 10 has a liquid crystal cell 11 in the VA mode; a front polarizing plate (polarizing plate on the observation side) 12 arranged on the front main face side (observation side) of the liquid crystal cell 11; and a back polarizing plate (polarizing plate on the backlight side) 13 arranged on the back main face side (backlight 20 side) of the liquid crystal cell 11. In addition to the front polarizing plate 12 and the back polarizing plate 13, the liquid crystal display of the present embodiment further has an optical element (optical component) 30 providing a polarizing effect which is provided on the backlight 20 side of the back polarizing plate 13.

Practically, any adhesive layer (not illustrated) may be arranged between the liquid crystal cell 11 and the front polarizing plate 12 and between the liquid crystal cell 11 and the back polarizing plate 13. Also, between the back polarizing plate 13 and the optical element 30, an adhesive layer (not illustrated) for attaching those components may be arranged.

Although the backlight 20 illustrated is of the direct type, the backlight may be of the side light type. When a side-light type backlight is adopted, the backlight 20 preferably further has a light guide plate and a light reflector.

In the liquid crystal display of the present embodiment, the back polarizing plate 13 has a lower contrast than the front polarizing plate 12, and has a higher transmittance than the front polarizing plate 12. The optical element 30 has a principal transmittance k1 of 80 to 86%, and a principal transmittance k2 of 2 to 8%. Such a configuration makes it possible to enhance the front white brightness while maintaining the front contrast ratio (contrast ratio in the front direction) of the liquid crystal display.

If the optical element 30 has a principal transmittance k2 of more than 8%, the front white brightness cannot be much enhanced by making the contrast of the back polarizing plate 13 lower than the contrast of the front polarizing plate 12 and making the transmittance of the back polarizing plate 13 higher than the transmittance of the front polarizing plate 12. However, if the optical element 30 has a principal transmittance k2 of not more than 8%, the front white brightness can be enhanced while the front contrast ratio is maintained, by making the contrast of the back polarizing plate 13 lower than the contrast of the front polarizing plate 12 and making the transmittance of the back polarizing plate 13 higher than the transmittance of the front polarizing plate 12.

In the case of having a high principal transmittance k2, the optical element 30 has a high cross transmittance. For this reason, the back polarizing plate 13 is required to be produced from a high contrast polarizing plate so that the contrast of the liquid crystal display is maintained when the optical element 30 is combined with the back polarizing plate 13. This means that the transmittance of the polarizing plate as the back polarizing plate 13 needs to be lowered, which is apparently the reason that the front white brightness cannot be enhanced.

In contrast, the optical element 30 has a low cross transmittance in the case of having a low principal transmittance k2. For this reason, the back polarizing plate 13 does not need to be produced from a high contrast polarizing plate to maintain the contrast of the liquid crystal display. This means that a high transmittance polarizing plate can be used as the back polarizing plate 13, which is apparently the reason that the front white brightness can be enhanced.

Hereinafter, more detailed description will be given for each component of the liquid crystal display according to the present embodiment.

<A. Outline of Liquid Crystal Panel>

The liquid crystal panel 10 is preferably a normally black liquid crystal panel.

"Normally black liquid crystal panel" herein refers to a liquid crystal panel that is configured to have the lowest transmittance (to be in the state where the screen is black) with no application of voltage and to have a high transmittance with application of voltage. The effect of the present invention is especially large in a normally black liquid crystal panel which provides black display with no application of voltage. This is probably because the effect provided by the two polarizing plates 12 and 13 having different transmittances is not inhibited by driven liquid molecules.

In this respect, the transmission axis of the front polarizing plate 12 and the transmission axis of the back polarizing plate 13 are preferably arranged such that they are substantially perpendicular to each other in a plan view of the display of the liquid crystal display. That is, the front polarizing plate 12 and the back polarizing plate 13 are preferably arranged in crossed Nicols. The transmission axis of the back polarizing plate 13 and the transmission axis of the optical element 30 are arranged such that they are substantially parallel to each other in a plane view of the display of the liquid crystal display. More specifically, the angle formed by the transmission axis of the front polarizing plate 12 and the transmission axis of the back polarizing plate 13 is preferably within the range of 90°±1° (more preferably of 90°±0.3°). The angle formed by the transmission axis of the back polarizing plate 13 and the transmission axis of the optical element 30 is preferably within the range of 0°±1° (more specifically of 0°±0.3°). If the angles are more than or less than the respective ranges of 90°±1° or 0°±1°, i.e., if the angles are out of those respective numerical ranges, the contrast may decrease in a view from the front.

Between those components of the liquid crystal panel 10, any layer may be arranged. For example, any retardation film may be arranged between the front polarizing plate 12 and the liquid crystal cell 11 and/or between the back polarizing plate 13 and the liquid crystal cell 11. When a retardation film is used, any appropriate positional relation can be selected for the relation between the slow axis of the retardation film and the absorption axis of the adjacent polarizing plate, according to the driving mode of the liquid crystal cell.

The difference (ΔT=T2−T1) between the transmittance (T2) of the back polarizing plate 13 and the transmittance (T1) of the front polarizing plate 12 is preferably 0.5 to 6.0%, and is more preferably 2.0 to 4.0%. A ΔT of less than 0.5% may result in insufficient enhancement in the front white brightness. On the other hand, a ΔT of more than 6.0% may lead to a decrease in the front contrast ratio.

The difference (ΔCR=CR1−CR2) between the contrast (CR2) of the back polarizing plate 13 and the contrast (CR1) of the front polarizing plate 12 can usually be suitably set within the range of from 2000 to 20000. A ΔT of less than 2000 may result in insufficient enhancement in the front white brightness. On the other hand, a ΔT of more than 20000 may lead to a decrease in the front contrast ratio.

<B. Liquid Crystal Cell>

Any appropriate liquid crystal cell may be adopted as the liquid crystal cell 11. Examples of the liquid crystal cell 11 include active-matrix liquid crystal cells having a thin-film transistor, and passive-matrix liquid crystal cells represented by super twist nematic liquid crystal displays.

The liquid crystal cell 11 preferably has a pair of substrates, and a liquid crystal layer as a display medium which is sandwiched by the pair of substrates. One of the substrates (which is an active matrix substrate) has a switching element (representatively a TFT) controlling the electro-optical characteristics of the liquid crystals; scanning lines providing gating signals to the switching element; and signal lines providing source signals to the switching element. The other of the substrates (which is a color filter substrate) has color filters. The color filters may be provided on the above active matrix substrate. Alternatively, the color filters may not be provided if an RGB three-color light source is employed as a lighting component of the liquid crystal display as in a field sequential liquid crystal display. The space between the two substrates is controlled by a spacer. Each of the substrates has, for example, an alignment film formed of polyimide on the side in contact with the liquid crystal layer.

The liquid crystal cell 11 preferably has a liquid crystal layer containing liquid crystal molecules that are arranged in a homeotropic alignment (vertically aligned liquid crystals) in a state with no electric field. This can almost eliminate the effect of the liquid crystal molecules on polarized light (transmitted light) in a no-electric-field state (black display) in the front direction, reducing the causes of depolarization between the front polarizing plate and the back polarizing plate. Hence, the effect of the present invention can be more effectively achieved. Here, the "homeotropic alignment" refers to an alignment with the alignment vectors of the liquid crystal molecules being uniformly perpendicular to the substrate plane, as a result of the interaction between the alignment-treated or alignment-untreated substrate and the liquid crystal molecules. The homeotropic alignment herein encompasses the case in which the liquid crystal molecules tilt slightly to the substrate plane, i.e., the liquid crystal molecules have a pretilt angle.

Representatively, a liquid crystal cell, having a liquid crystal layer that contains liquid crystal molecules arranged in the homeotropic alignment in the state where no electric field exists, shows an index ellipsoid with the relation nz>nx=ny. Here, nx=ny encompasses not only the case of nx and ny being completely the same but also the case of nx and ny being substantially the same. Examples of the representative driving mode of the liquid crystal cell 11 include the vertical alignment (VA) mode and the vertical alignment twisted nematic (VATN) mode.

<C. Polarizing Plate>

The polarizing plates (the front polarizing plate 12 and the back polarizing plate 13) in the present embodiment can be any polarizing plates as long as the plates have a transmittance and a contrast that satisfy the above relation. The "polarizing plate" herein refers to a polarizing plate that changes natural light or polarized light into linearly polarized light. The polarizing plate preferably has a function to divide the entering light into two perpendicular polarization components, and to let one of the polarization components transmit therethrough and absorb, reflect, and/or scatter the other of the polarization components.

The thickness of each of the front polarizing plate 12 and the back polarizing plate 13 is not particularly limited, and may be of any general value for the thickness of a thin film, a film, or a sheet. The thickness of each of the front polarizing plate 12 and the back polarizing plate 13 is preferably 1 to 250 μm, and is more preferably 20 to 250 μm. With the front polarizing plate 12 and the back polarizing plate 13 having a thickness within the above range, the polarizing plates 12 and 13 having excellent mechanical strength can be produced.

Each of the front polarizing plate 12 and the back polarizing plate 13 may be a single layer having a polarizing function (such a layer is also referred to as a polarizer), or may be a laminate having multiple layers. In the case that the front polarizing plate 12 and the back polarizing plate 13 are laminates, examples of the laminate include (a) laminates having a polarizer and a protective layer; (b) laminates having a polarizer, a protective layer, and a surface treatment layer; and (c) laminates having two or more polarizers. The front polarizing plate 12 and the back polarizing plate 13 may have two or more surface treatment layers. Alternatively, the front polarizing plate 12 and the back polarizing plate 13 may have a protective layer that has a function to expand the viewing angle of the liquid crystal cell 11 (a layer having such a function is also referred to as an optical compensation layer).

The front polarizing plate 12 preferably has a transmittance (T1) of 40 to 45%, and more preferably of 42 to 44%. A T1 of less than 40% may not lead to sufficient enhancement in the front white brightness. On the other hand, a T1 of more than 45% may decrease the front contrast ratio.

The back polarizing plate 13 preferably has a transmittance (T2) of 42 to 48%, and more preferably of 43 to 46%. A T1 of less than 42% may decrease the front contrast ratio. On the other hand, a T1 of more than 48% may not lead to sufficient enhancement in the front white brightness.

Usually, the contrast (CR1) of the front polarizing plate 12 can be appropriately set within the range of 2000 to 60000. A CR1 of less than 2000 leads to the effect of the present invention, but may excessively decrease the front contrast ratio of the liquid crystal display. On the other hand, a CR1 of more than 60000 may decrease the front white brightness.

Usually, the contrast (CR2) of the back polarizing plate 13 can be appropriately set within the range of 500 to 35000. A CR2 of less than 500 may decrease the front contrast ratio. On the other hand, a CR2 of more than 35000 leads to the effect of the present invention, but may decrease the front white brightness.

The liquid crystal panel 10 can be produced for example by appropriately combining selected commercially available polarizing plates that have different transmittances. Preferably, the liquid crystal panel 10 is produced by appropriately adjusting the transmittances and the contrasts of the front polarizing plate 12 and the back polarizing plate 13 according to the driving mode, application, and the like of the liquid crystal cell 11 such that a high front contrast ratio is achieved.

The method of increasing or decreasing the transmittances and the contrasts of the front polarizing plate 12 and the back polarizing plate 13 may be, for example, a method of adjusting the amount of iodine in the polarizers in the case that the front polarizing plate 12 and the back polarizing plate 13 are produced from polarizers mainly containing a polyvinyl alcohol resin that contains iodine. More specifically, increasing the amount of iodine in the polarizers can lead to low transmittances and high contrasts of the front polarizing plate 12 and the back polarizing plate 13. In contrast, decreasing the amount of iodine in the polarizers can lead to high transmittances and low contrasts of the front polarizing plate 12 and the back polarizing plate 13. This method is applicable to both production of rolled-state front polarizing plate 12 and back polarizing plate 13, and production of sheet-state front polarizing plate 12 and back polarizing plate 13. The polarizers will be described later.

<C-1. Polarizer>

Any appropriate polarizer can be employed as the polarizer in the present embodiment. Preferably, the front polarizing plate 12 and the back polarizing plate 13 respectively include a first polarizer and a second polarizer, and each of those first polarizer and second polarizer mainly contains a polyvinyl alcohol resin containing iodine. The above polarizers can be usually produced by extending a polymer film mainly containing a polyvinyl alcohol resin that contains iodine. A polarizing plate including such a polarizer is excellent in the optical characteristics.

A commercially available film may be directly used as the polymer film mainly containing a polyvinyl alcohol resin. Examples of the commercially available polymer film mainly containing a polyvinyl alcohol resin include "Kuraray Vinylon Film" produced by Kuraray Co., Ltd., "Tohcello Vinylon Film" produced by Tohcello Co., Ltd., and "Nichigo Vinylon Film" produced by Nippon Synthetic Chemical Industry Co., Ltd.

<C-2. Protective Layer>

Each of the front polarizing plate 12 and the back polarizing plate 13 preferably has a polarizer and protective layers arranged on both sides of the polarizer. The protective layers can, for example, prevent contraction and expansion of the polarizer, or prevent degradation of the polarizer due to ultraviolet rays, thereby contributing to production of a polarizing plate having high durability.

The front polarizing plate 12 preferably has a first polarizer; a first protective layer arranged on the liquid crystal cell 11 side of the first polarizer; and a second protective layer arranged on the opposite side of the liquid crystal cell 11 side of the first polarizer. The back polarizing plate 13 preferably has a second polarizer; a third protective layer arranged on the liquid crystal cell 11 side of the second polarizer; and a fourth protective layer arranged on the opposite side of the liquid crystal cell 11 side of the second polarizer.

The protective layer and the polarizer can be laminated via any appropriate adhesive layer. The "adhesive layer" herein refers to a layer that joins faces of adjacent optical components, and integrates those components with practically sufficient adhesive strength in a practically sufficient adhesion time. Examples of the material for forming the adhesive layer include adhesives and anchor coating agents. The adhesive layer may have a multilayer structure in which an anchor coating layer is formed on the surface of an adherend, and an adhesive agent layer is formed on the anchor coating layer. Further, the adhesive layer may be a thin layer (also referred to as a hairline) which may not be visible to the naked eye.

If the polarizer mainly contains a polyvinyl alcohol resin that contains iodine, the material for forming the adhesive layer is preferably a water-soluble adhesive. The water-soluble adhesive is preferably a water-soluble adhesive mainly containing a polyvinyl alcohol resin. A commercially available adhesive can also be directly used as the above adhesive layer. Alternatively, a solvent and an additive can also be mixed into a commercially available adhesive. Examples of the commercially available adhesive mainly containing a polyvinyl alcohol resin include "GOHSEFIMER Z200" produced by Nippon Synthetic Chemical Industry Co., Ltd.

The water-soluble adhesive may further contain a crosslinking agent as an additive agent. Examples of the kind of the crosslinking agent include amine compounds, aldehyde compounds, methylol compounds, epoxy compounds, isocyanate compounds, and polyvalent metallic salts. A commercially available crosslinking agent can also be directly used as the above crosslinking agent. Examples of the commercially available crosslinking agent include "Glyoxal" which is an aldehyde compound produced by Nippon Synthetic Chemical Industry Co., Ltd. The addition amount of the crosslinking agent may be suitably adjusted according to the purpose, and is usually more than 0 parts by weight and not more than 10 parts by weight based on 100 parts by weight of a solid content of the water-soluble adhesive.

[First Protective Layer]

The first protective layer is arranged on the liquid crystal cell 11 side of the first polarizer. The thickness of the first protective layer may be any appropriate value according to the purpose. The thickness of the protective layer is preferably 20 μm to 100 μm. With the first protective layer having a thickness within the above range, a polarizing plate having excellent mechanical strength can be produced.

Since the first protective layer is arranged between the front and back polarizers, the optical characteristics of the first protective layer may affect the display characteristics of the liquid crystal display. Accordingly, the first protective layer preferably has high optical transparency, preferably has excellent heat resistance, moisture permeability, and mechanical strength in terms of improvement in the durability of the first polarizer, preferably has excellent surface smoothness and cohesion to an adhesive in terms of improvement in cohesion to the first polarizer, and preferably has excellent cohesion to a pressure sensitive adhesive in terms of improvement in cohesion to the liquid crystal cell 11.

Any appropriate material may be adopted as the material constituting the first protective layer. Examples of the material include polymer films formed of a norbornene resin, and polymer films formed of a cellulose resin. Among these, polymer films formed of a norbornene resin is most preferable in terms of suppressing, in black display, uneven light leakage resulting from factors such as temperature unevenness.

A commercially available film can be directly used as the first protective layer. Alternatively, it is possible to employ a commercially available film to which secondary machining such as stretching treatment and/or shrinking treatment has been performed in order to provide the function of a retardation film for optical compensation. Examples of commercially available polymer films formed of a cellulose resin include "FUJITAC" produced by Fuji Photo Film Co., Ltd., and "KC8UX2M" produced by Konica Minolta Opto, Inc. Examples of polymer films formed of a norbornene resin include "ZEONOR film" produced by Zeon Corporation, and "ARTON" produced by JSR Corporation.

[Second Protective Layer]

A second protective layer is arranged on the opposite side of the liquid crystal cell 11 side of the first polarizer. Any appropriate layer may be adopted as the second protective layer. Here, the layer adopted as the second protective layer preferably has excellent heat resistance, moisture permeability, and mechanical strength in terms of improvement in the durability of the first polarizer, and has excellent surface smoothness and cohesion to an adhesive in terms of improvement in cohesion to the first polarizer.

Any appropriate material may be adopted as the material constituting the second protective layer. The second protective layer is preferably a polymer film formed of a cellulose resin in terms of cohesion to the first polarizer. The polymer film formed of a cellulose resin is preferably the same polymer film as that for the first protective layer.

The second protective layer may receive any appropriate treatment on the surface thereof as long as the front polarizing plate 12 has a transmittance and a contrast that satisfy the above relation. For example, a commercially available polymer film to which surface treatment has already been performed can be used as the second protective layer. Alternatively, any surface treatment can also be performed on a commercially available polymer film before use. Examples of the surface treatment include diffusion treatment (anti-glare treatment), reflection preventing treatment (anti-reflection treatment), hard coat treatment, and antistatic treatment. Examples of a commercially available diffusion treatment (anti-glare treatment) product include products such as AG150, AGS1, AGS2, and AGT1 produced by Nitto Denko Corporation. Examples of a commercially available reflection preventing treatment (anti-reflection treatment) product include products such as ARS and ARC produced by Nitto Denko Corporation. Examples of a commercially available film having hard coat treatment and antistatic treatment performed thereon include "KC8 UX-HA" produced by Konica Minolta Opto, Inc.

[Surface Treatment Layer]

According to need, a surface treatment layer may be provided on the opposite side of the first polarizer side of the second protective layer. Any appropriate layer may be adopted as the surface treatment layer according to the purpose. Examples of the surface treatment layer include diffusion treatment (anti-glare treatment) layers, reflection preventing treatment (anti-reflection treatment) layers, hard coat treatment layers, and antistatic treatment layers. These surface treatment layers are used in order to prevent a screen from being contaminated or damaged, and to prevent a display image from becoming difficult to see when the light from an indoor fluorescent lamp or from the sun are reflected on the screen. The surface treatment layer is commonly produced by fixing a treatment agent for forming the treatment layer, on the surface of a base film. The base film may also serve as the second protective layer. The surface treatment layer may have a multilayer structure in which a hard coat treatment layer is piled on an antistatic treatment layer, for example. Examples of a commercially available surface treatment layer having reflection preventing treatment performed thereon include ReaLook series produced by NOF Corporation.

The surface treatment layer preferably has a moth-eye structure in which a fine convex/concave pattern, having the cycle of the convex/concave pattern controlled to not more than the wavelength of visible light, is formed on the base film. This further enhances the white brightness to provide a better effect of the present invention. Also, surface reflection in bright rooms is reduced, and therefore the effect of the present invention can be fully achieved even in bright rooms. The above moth-eye structure can be produced according to the method described in WO 2006/059686 A1, for example.

[Third Protective Layer]

The third protective layer is arranged on the liquid crystal cell 11 side of the second polarizer. Any appropriate materials, characteristics, conditions, and the like described above for the first protective layer can be adopted for the third protective layer. The first protective layer and the third protective layer may be the same as or different from each other.

[Fourth Protective Layer]

The fourth protective layer is arranged on the opposite side of the liquid crystal cell 11 side of the second polarizer. Any appropriate materials, characteristics, conditions, and the like described above for the second protective layer can be adopted for the fourth protective layer. The second protective layer and the fourth protective layer may be the same as or different from each other.

At least one of the first protective layer and the third protective layer preferably serves as a retardation film (optical compensation layer) for optical compensation (viewing angle compensation). This can reduce light leakage in an oblique direction in black display, thereby reducing the amount of light which has been originally emitted in an oblique direction and scattered on the surface treatment layer or the like to be emitted in the front direction. Accordingly, the effect of the present invention can be more effectively provided.

In the case that only one of the first protective layer and the third protective layer is to serve as a retardation film, it is preferable to provide such a function to the third protective layer. That is, the back polarizing plate preferably has a retardation film on the liquid crystal cell side. The liquid crystal cell has many scattering components causing depolarization, such as a switching element, wirings, and color filters. For this reason, optical compensation can be more effectively provided in the case that optical compensation is provided before depolarization (in the case that the third protective layer is designed to serve as a retardation film) than in the case that optical compensation is provided after depolarization (in the case that the first protective layer is designed to serve as a retardation film). Accordingly, the light leakage in an oblique direction in black display can be further reduced in the case that the third protective layer is designed to serve as a retardation film, whereby the amount of light can be further reduced which has been originally emitted in an oblique direction and scattered on the surface treatment layer or the like to be emitted in the front direction. Therefore, the effect of the present invention can be more effectively provided.

The retardation film preferably shows an index ellipsoid where the principal refractive indices nx, ny, and nz satisfy the relation $nx \geq ny > nz$. This makes it possible to effectively reduce light leakage in an oblique direction in black display, in a liquid crystal cell containing liquid crystal molecules showing an index ellipsoid satisfying the relation $nz > nx = ny$ (liquid crystal cell in the vertical alignment mode). Hence, in a liquid crystal cell in the vertical alignment mode, the amount of light can be reduced which has been originally emitted in an oblique direction and scattered on the surface treatment layer or the like to be emitted in the front direction. As a result, the effect of the present invention can be more effectively achieved in a liquid crystal cell in the vertical alignment mode.

More specifically, the retardation film satisfying the relation $nx > ny > nz$ can be seen in structures such as the following structures. In one structure, one retardation film satisfying the relation $nx > ny > nz$ is arranged as the first protective layer or the third protective layer. In another structure, one retardation film satisfying the relation $nx = ny > nz$ is arranged as one of the first protective layer and the third protective layer, and one retardation film satisfying the relation $nx > ny > nz$ is arranged as the other of the first protective layer and the third protective layer. In yet another structure, one retardation film satisfying the relation $nx > ny > nz$ is arranged as the first protective layer, and one retardation film satisfying the relation $nx > ny > nz$ is arranged as the third protective layer. The combination of retardation films and specific retardation values are not particularly limited and can be optionally set, as long as they are designed to reduce light leakage in an oblique direction.

Under existing circumstances, a polymer film produced from a cellulose resin is usually used as the fourth protective layer in a liquid crystal display having a homeotropic alignment (vertical alignment). As the polymer film, TAC (negative C plate satisfying the relation $nx = ny > nz$) is usually used.

When, however, the retardation film has been arranged as the third protective layer in the above case, the contrast of the liquid crystal display in an oblique viewing angle deteriorates if the slow axis of the retardation film and the absorption axis of the second polarizer forms an angle that is off an ideal design value (for example, 90°).

Usually in attachment of polarizing plates, it is difficult to form an angle with the ideal design value by the slow axis of the retardation film and the absorption axis of the polarizer because of the machining in the attachment, differences in slow axes in production of retardation films, and the like. That is, in conventional liquid crystal displays having the homeotropic alignment (vertical alignment), which has the retardation film as the third protective layer, the contrast of the liquid crystal display in an oblique viewing angle has tended to deteriorate.

In contrast, let the liquid crystal display of the present embodiment have a liquid crystal layer with vertically aligned liquid crystals and have the retardation film arranged as the third protective layer. Even in this case, the liquid crystal display of the present embodiment can suppress deterioration in the contrast in an oblique viewing angle resulting from displacement of axes of the retardation film and the polarizer in the back polarizing plate 13 and can even improve the contrast in an oblique viewing angle, compared to the conventional vertical alignment liquid crystal displays which use the same polarizer in the front polarizing plate and the back polarizing plate. That is, the liquid crystal display of the present embodiment can have a design that can strongly resist the misalignment of the axes of the retardation film and the polarizer in the back polarizing plate 13 (a design with a large margin of axis misalignment).

More specifically, in this case, the angle formed by the slow axis of the retardation film as the third protective layer and the absorption axis of the second polarizer can be preferably set within the range of 90°±1° (more preferably 90°±0.5°).

Meanwhile, in the case that the retardation film is arranged as the first protective layer, the margin of misalignment between the retardation film as the first protective layer and the first polarizer is smaller than the margin of misalignment on the back polarizing plate 13 side. More specifically, the slow axis of the retardation film as the first protective layer and the absorption axis of the first polarizer are preferably designed to form an angle within the range of 90°±0.5° (suitably 90°±0.3°).

In this way, the liquid crystal display of the present embodiment is suitable for an embodiment in which the back polarizing plate 13 has a retardation layer on the liquid crystal cell 11 side, and a liquid crystal layer contains vertically aligned liquid crystals. The liquid crystal display of the present invention is particularly suitable for an embodiment in which the back polarizing plate 13 has a retardation layer on the liquid crystal cell 11 side, a liquid crystal layer contains vertically aligned liquid crystals, and the back polarizing plate 13 has a negative C plate on the optical element 30 side.

The retardation value Rth[550] in the thickness direction of the negative C plate, which functions as a protective layer, is preferably not more than 100 nm (more preferably not more than 70 nm). A retardation value Rth[550] of more than 100 nm may decrease the contrast in an oblique viewing angle.

The in-plane retardation value Re[550] of the negative C plate is not necessarily 0 nm as long as being within the range providing the effect of the present invention, and is preferably not more than 10 nm (more preferably not more than 5 nm). An in-plate retardation value Re [550] of more than 10 nm may decrease the front contrast.

<D. Adhesive Layer>

In a preferable embodiment, the polarizing plates (the front polarizing plate 12 and the back polarizing plate 13) are attached to the liquid crystal panel via adhesive layers. Appropriate adhesive and/or anchor coat agent can be selected as the material(s) for forming the adhesive layer, according to the type and the application of the adherend. Specific examples of the adhesive, according to the form thereof, include solvent adhesives, emulsion adhesives, pressure sensitive adhesives, remoistening adhesives, polycondensation adhesives, solventless adhesives, film adhesives, and hot melt adhesives. According to the chemical structure, examples of the adhesive include synthetic resin adhesives, elastomeric adhesives, and natural product adhesives. The adhesive encompasses viscoelastic substances (also called pressure sensitive adhesives) which show the adhesive strength being able to be exerted upon pressure contact at room temperature.

The material for forming the above adhesive layer is preferably a pressure sensitive adhesive having an acrylic polymer as its base polymer (also referred to as an acrylic pressure sensitive adhesive). This is because such a pressure sensitive adhesive has excellent transparency, adhesiveness, weather resistance, and heat resistance. The thickness of the acrylic pressure sensitive adhesive layer may be appropriately adjusted according to the material and the application of the adherend, but is usually 5 to 50 μm.

<E. Optical Element Providing Polarizing Effect>

The optical element 30 providing a polarizing effect is only required to have a function to divide the entering light into two perpendicular polarization components, and to let one of the polarization components transmit therethrough and absorb or reflect the other of the polarization components. Examples thereof include wire grid polarizers, iodine polarizers, and dye polarizers. In terms of further enhancing the brightness (white brightness) in the case that the liquid crystal display shows a white image, a brightness enhancing film or a wire grid polarizer is preferable which has a function to reflect the polarization component not to be transmitted. They enable reuse of the light not to be transmitted by reflection, and are therefore preferable in terms of effective utilization of light.

The principal transmittance k1 of the optical element 30 is 80 to 86%, and is preferably 82 to 84%. A principal transmittance k1 of less than 80% may decrease the front white brightness. On the other hand, a principal transmittance k1 of more than 86% may make it difficult to provide a sufficient principal transmittance k2 at the same time.

The principal transmittance k2 of the optical element 30 is 2 to 8%, and is preferably 2 to 6%. A principal transmittance k2 of more than 8% may decrease the front contrast ratio. On the other hand, a principal transmittance k2 of less than 2% may decrease the front white brightness.

<E-1. Brightness Enhancing Film>

The brightness enhancing film is used to enhance the white brightness of the liquid crystal display. The brightness enhancing film is preferably a laminate including a thermoplastic resin layer (A) and a thermoplastic resin layer (B). A representative brightness enhancing film is a film in which the thermoplastic resin layer (A) and the thermoplastic resin layer (B) are alternately arranged (i.e., ABABAB and so forth). The number of layers constituting the brightness enhancing film is preferably 2 to 20, and is more preferably 2 to 15. A brightness enhancing film having such a structure is produced for example by co-extruding two kinds of resins and then extending the extruded film. The total thickness of the brightness enhancing film is preferably 20 to 800 μm.

The thermoplastic resin layer (A) preferably shows optical anisotropy. The thermoplastic resin layer (A) preferably has an in-plane birefringence (ΔnA) of not less than 0.05, and more preferably not less than 0.1, and still more preferably not less than 0.15. In terms of the optical homogeneity, the upper limit of the ΔnA is preferably 0.2. Here, the ΔnA represents the difference (nxA−nyA) between nxA (refractive index in the slow axis direction) and nyA (refractive index in the fast axis direction).

The thermoplastic resin layer (B) preferably substantially shows optical isotropy. The thermoplastic resin (B) preferably has an in-plane birefringence (ΔnB) of not more than $5\times10^{-4}$, more preferably not more than $1\times10^{-4}$, and still more preferably not more than $0.5\times10^{-4}$. The lower limit of AnB is preferably $0.01\times10^{-4}$. Here, AnB represents the difference (nxB−nyB) between nxB (refractive index in the slow axis direction) and nyB (refractive index in the fast axis direction).

"nyA" of the thermoplastic resin layer (A) and "nyB" of the thermoplastic resin layer (B) are preferably substantially the same as each other. The absolute value of the difference between nyA and nyB is preferably not more than $5\times10^{-4}$, more preferably not more than $1\times10^{-4}$, and still more preferably not more than $0.5\times10^{-4}$. A brightness enhancing film having such optical characteristics has an excellent function to reflect a polarization component.

Any appropriate resin may be selected as the resin for forming the thermoplastic resin layer (A). The thermoplastic resin layer (A) preferably contains a polyethylene terephthalate resin, a polytrimethylene terephthalate resin, a polybutylene terephthalate resin, a polyethylenenaphthalate resin, a polybutylene naphthalate resin, or a mixture of these resins. These resins have excellent expression of birefringence upon extension, and have excellent stability of the birefringence after extension.

Any appropriate layer may be selected as the thermoplastic resin layer (B). The thermoplastic resin layer (B) preferably contains a polystyrene resin, a polymethylmethacrylate resin, a polystyrene glycidylmethacrylate resin, or a mixture of these resins. The above resins may contain halogen groups such as chlorine, bromine, and iodine in order to increase the refractive index. Alternatively, the resin may contain any additive in order to adjust the refractive index.

<E-2. Wire Grid Polarizer>

The wire grid polarizer is used to enhance the white brightness of the liquid crystal display. The wire grid polarizer is preferably formed by arranging conductive lines such as metal on a substrate at a specific pitch in such a manner that a slit is formed between the conductive lines. If the above pitch is quite smaller (not more than ½, for example) than that of incident light (for example, a wavelength of visible light, 400 to 800 nm), the wire grid polarizer reflects most electric field vector components vibrating in parallel to the conductive lines and lets most electric field vector components perpendicular to the conductive lines transmit therethrough. Accordingly, single polarization can be provided.

The wire grid polarizer can be produced for example by the method described in JP 2005-70456 A. The performance (transmittance and contrast) of a wire grid polarizer can be changed by adjusting the width, cycle (pitch), and height (thickness) of the conductive line (metal wire). More specifically, the ratio W/P of the width W and the cycle (pitch) P of the conductive lines in the present embodiment is preferably 25 to 50%, and more preferably 30 to 42%. The cycle (pitch) of the conductive lines is preferably not more than 500 nm, and is more preferably not more than 200 nm. The thickness of the conductive lines is preferably 10 to 300 nm, and more preferably 80 to 150 nm.

Elements such as gold, silver, copper, aluminum, iron, nickel, titanium, and tungsten, and alloys of these elements can be used as the material of the conductive line. Among these, aluminum is most preferable in terms of high reflectivity, flat wavelength dependency over visible light, and easy maintenance of high reflectance through aging (hazing).

<F. Optical Sheet>

The number and the type of the optical sheets 24 are not particularly limited, and can be optionally selected. In this way, the optical components illustrated in FIG. 1 may not have a part thereof or may be substituted for another optical component, according to the configuration of the liquid crystal display such as the lighting method of the liquid crystal display and the driving mode of the liquid crystal cell, as long as the effect of the present invention can be provided. Examples of the optical sheets 24 include prism sheets (for example, "BEF" produced by Sumitomo 3M Limited) and diffusion sheets (for example, "OPALUS" produced by KEIWA Incorporated). The prism sheets regularly change the angle of emergence to enhance the brightness in the normal direction. The diffusion sheets are for irregularly changing the angle of emergence to enhance the brightness in the normal direction, and for making the uneven brightness due to the cold cathode tube 21 less noticeable.

<G. Diffuser>

The diffuser 23 emits light from its surface by diffusing the light emitted from the cold cathode tube 21. The diffuser 23 makes the uneven brightness due to the cold cathode tube 21 less noticeable by diffusing the light emitted from the cold cathode tube 21 into the surface direction. The diffuser 23 is produced for example from a resin such as a polycarbonate resin and an acrylic resin. Here, the material, the thickness, the haze value, and the like of the diffuser 23 are not particularly limited.

The liquid crystal display of the present embodiment is used for any appropriate application. The application may be, for example, OA equipment such as a PC monitor, a laptop, and a copy machine; portable devices such as a cell phone, a watch, a digital camera, a Personal Digital Assistant (PDA), and a handheld game console; household electrical equipment such as a video camera, a television, and a microwave; vehicle equipment such as a back monitor, a car-navigation system monitor, and a car audio; exhibition equipment such as an information monitor for commercial stores; security equipment such as a surveillance monitor; and nursing/medical equipment such as a nursing monitor and a medical monitor.

The preferable application of the liquid crystal display of the present embodiment is a television. The television has a screen size of preferably not smaller than a wide 17" screen (373 mm×224 mm), more preferably not smaller than a wide 23" screen (499 mm×300 mm), and still more preferably not smaller than a wide 32" screen (687 mm×412 mm).

<H. Verification by Simulation>

The results of verification of the effect of the present invention by computer simulation are shown below.

Figure 2:
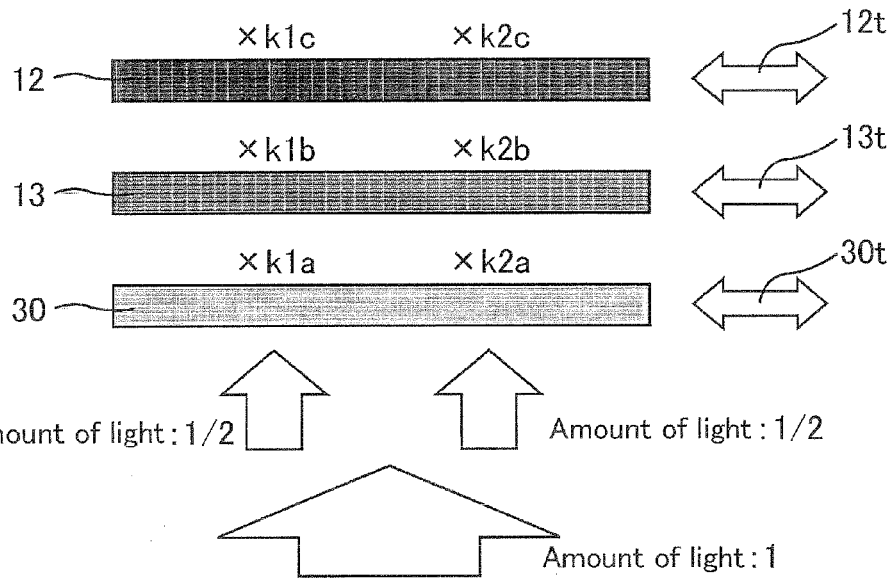
FIG. 2 are schematic views for explaining the methods of determining the white brightness and the black brightness in the liquid crystal display of Embodiment 1.
Figure 2:
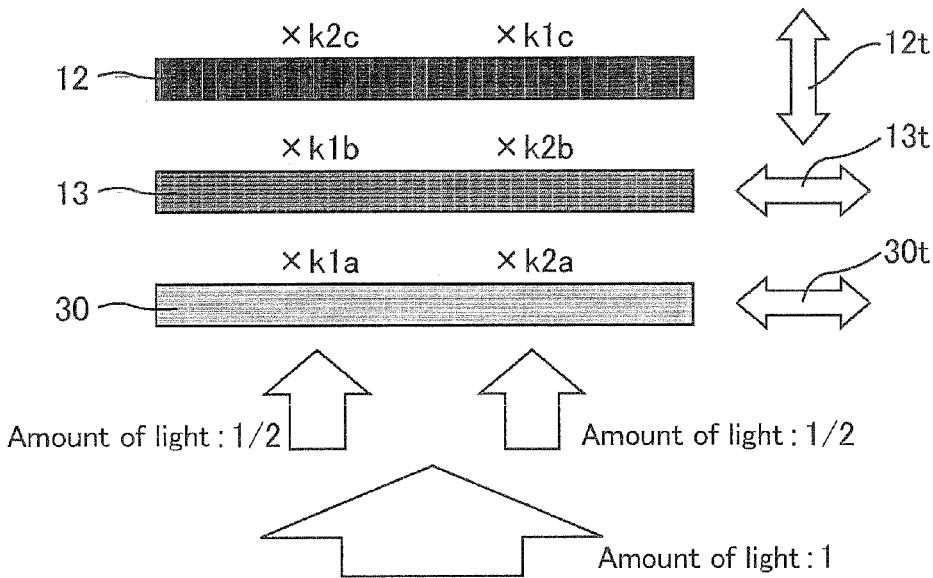
Figure 3:
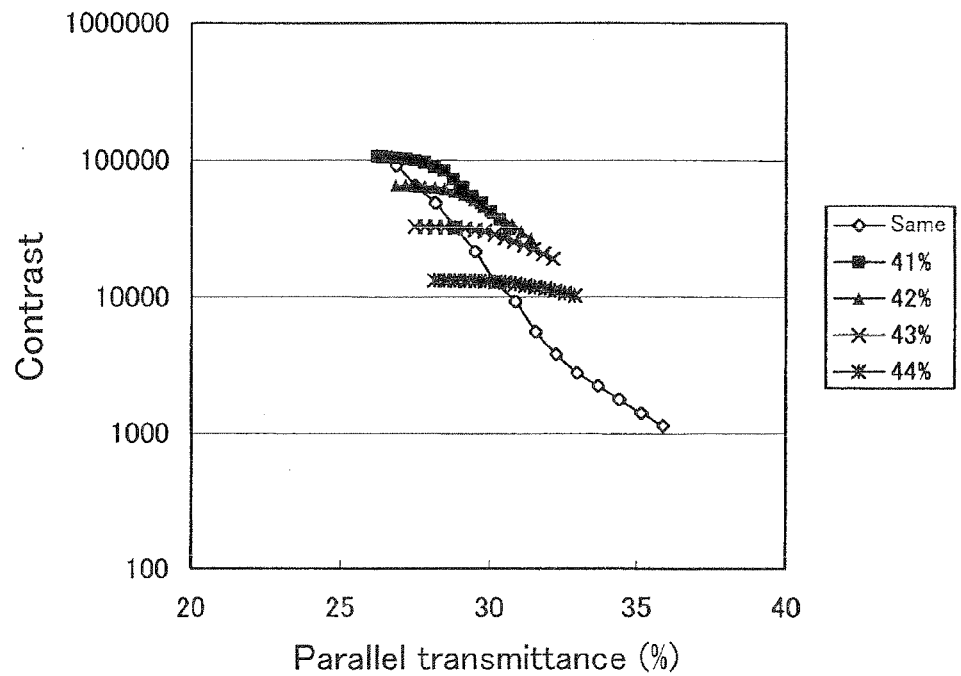
FIG. 3 is a graph that plots the white brightness and the contrast of the liquid crystal display in the case that the optical element has a principal transmittance k2 of 2% and a principal transmittance k1 of 78% (Comparative Example).
Figure 4:
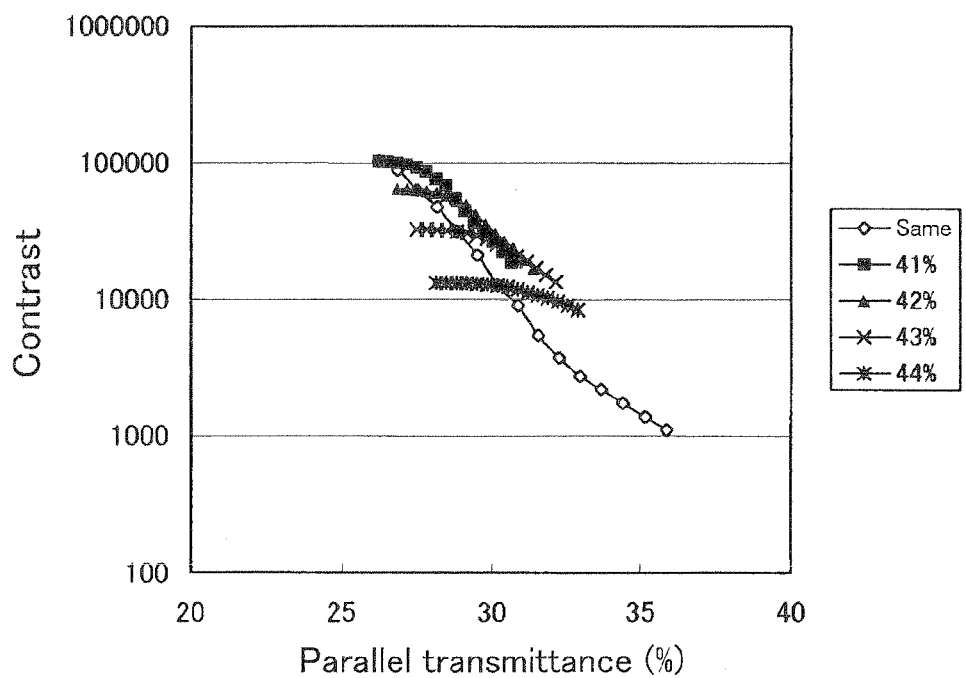
FIG. 4 is a graph that plots the white brightness and the contrast of the liquid crystal display in the case that the optical element has a principal transmittance k2 of 4% and a principal transmittance k1 of 78% (Comparative Example).
Figure 5:
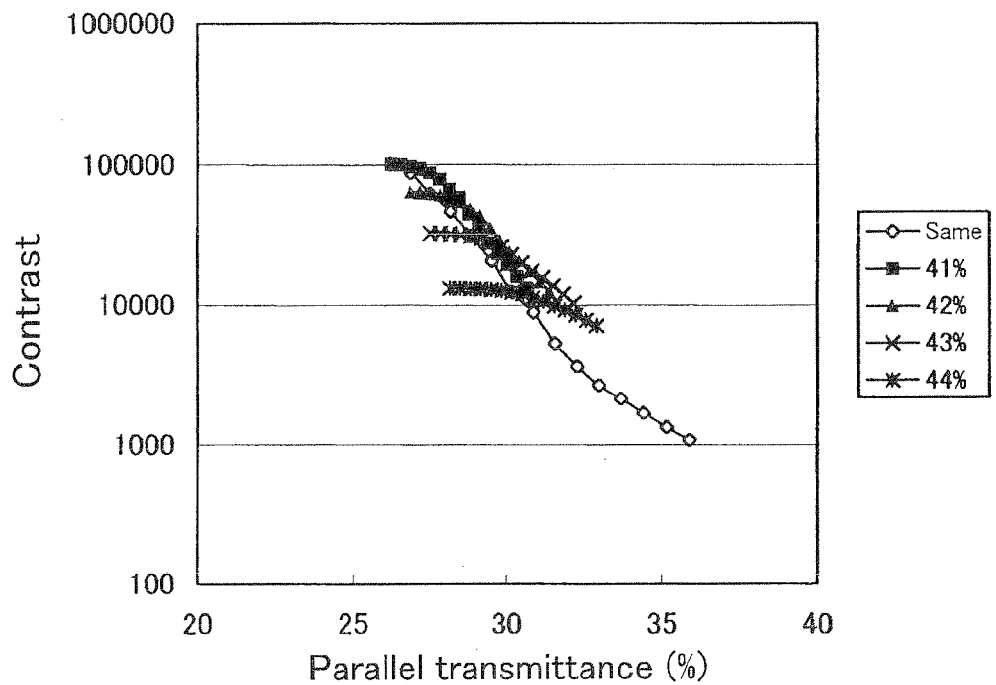
FIG. 5 is a graph that plots the white brightness and the contrast of the liquid crystal display in the case that the optical element has a principal transmittance k2 of 6% and a principal transmittance k1 of 78% (Comparative Example).
Figure 6:
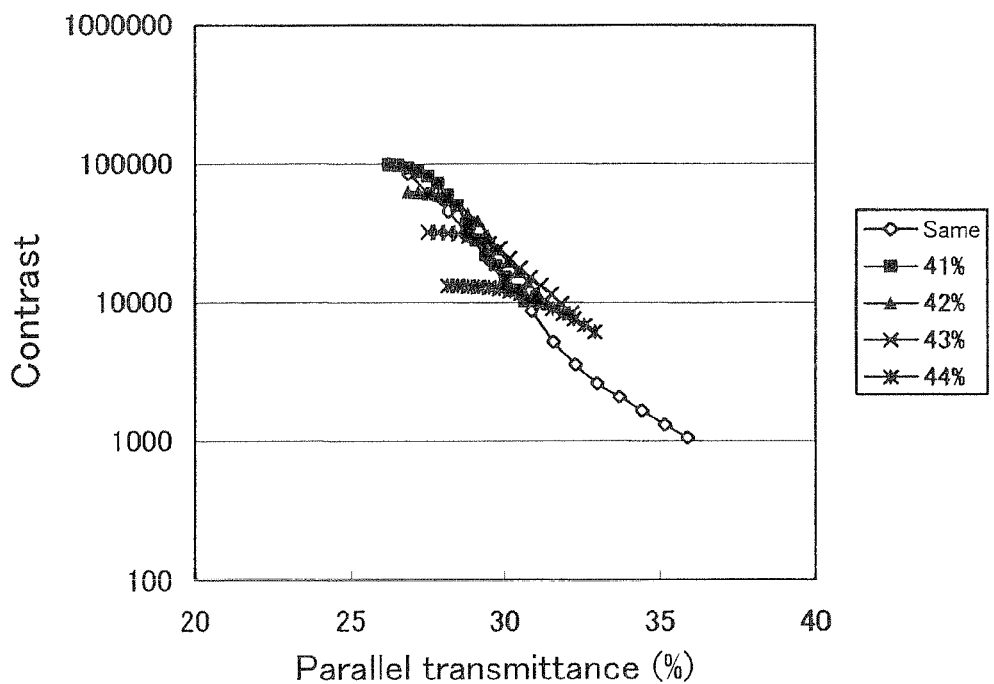
FIG. 6 is a graph that plots the white brightness and the contrast of the liquid crystal display in the case that the optical element has a principal transmittance k2 of 8% and a principal transmittance k1 of 78% (Comparative Example).
Figure 7:
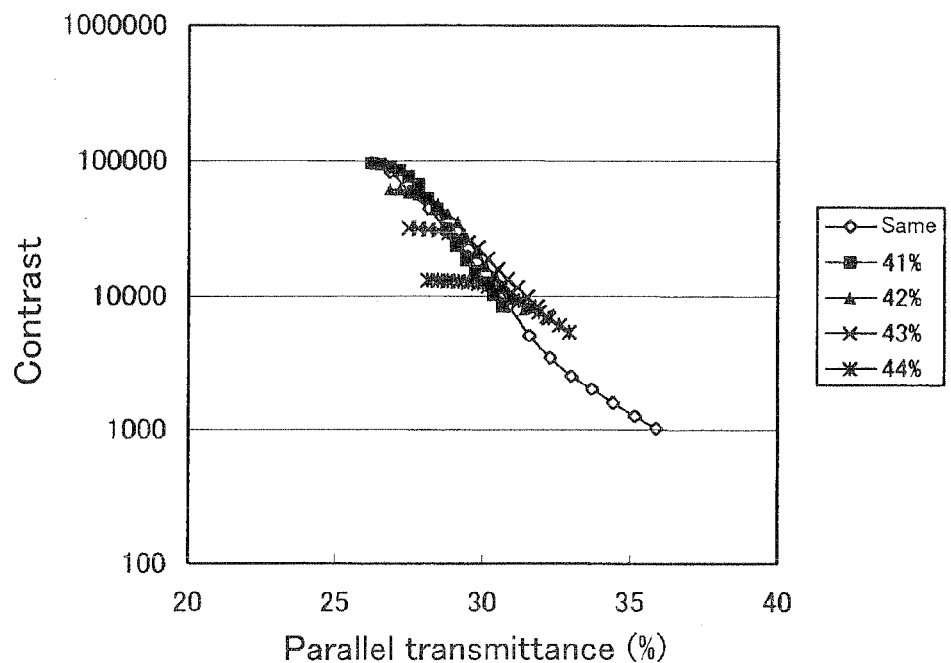
FIG. 7 is a graph that plots the white brightness and the contrast of the liquid crystal display in the case that the optical element has a principal transmittance k2 of 10% and a principal transmittance k1 of 78% (Comparative Example).
Figure 8:
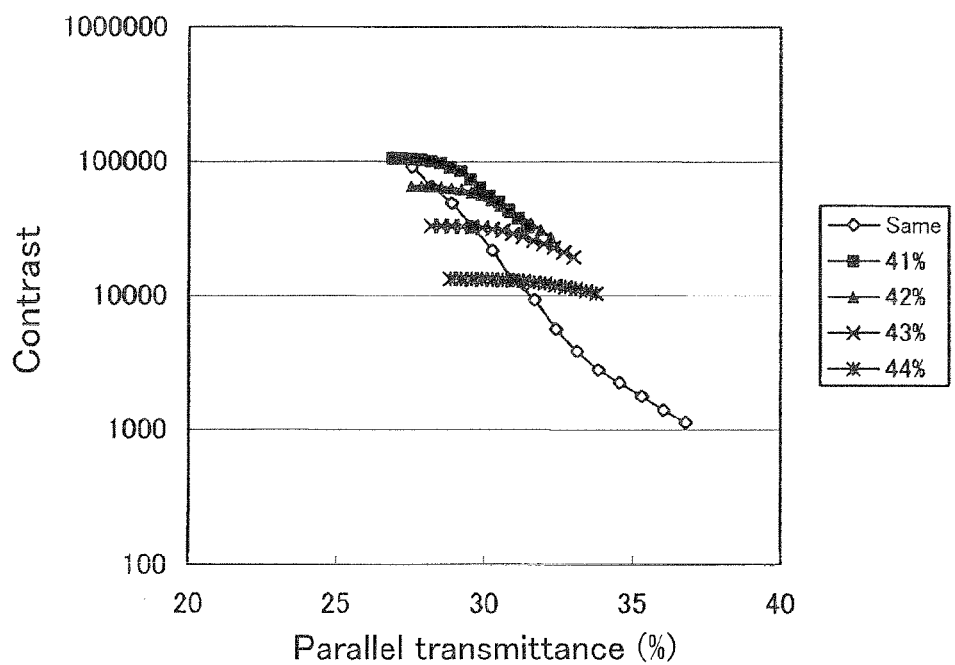
FIG. 8 is a graph that plots the white brightness and the contrast of the liquid crystal display in the case that the optical element has a principal transmittance k2 of 2% and a principal transmittance k1 of 80%.
Figure 9:
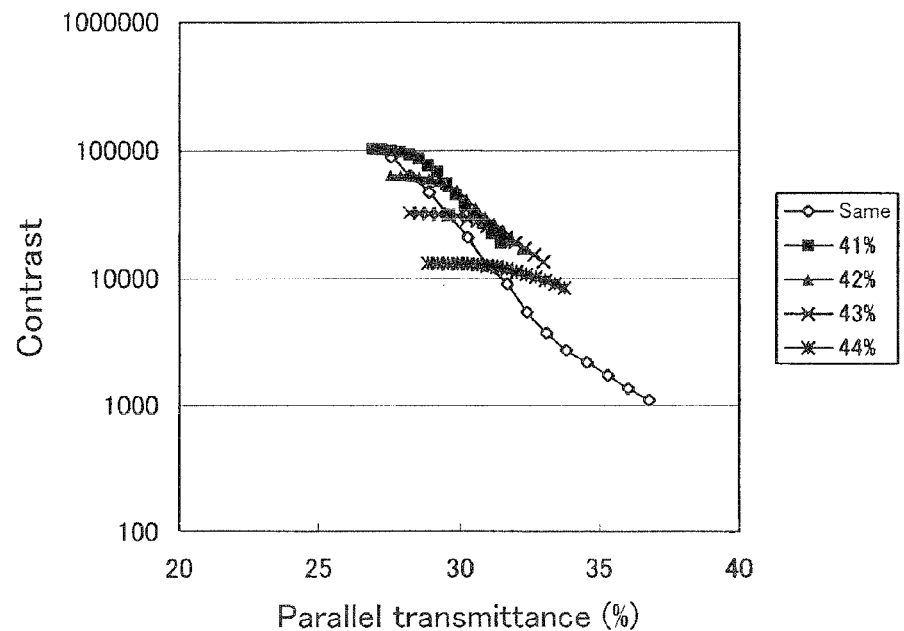
FIG. 9 is a graph that plots the white brightness and the contrast of the liquid crystal display in the case that the optical element has a principal transmittance k2 of 4% and a principal transmittance k1 of 80%.
Figure 10:
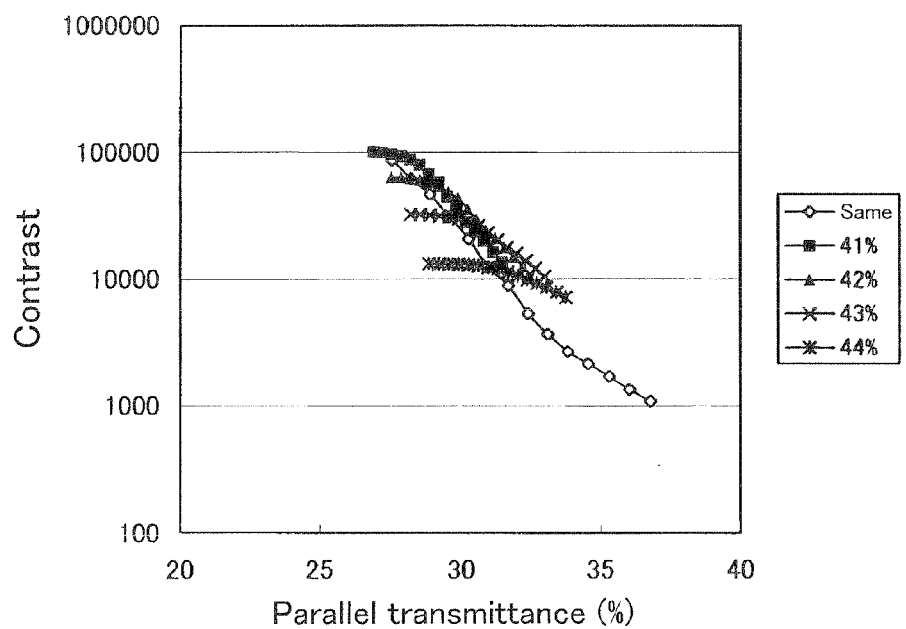
FIG. 10 is a graph that plots the white brightness and the contrast of the liquid crystal display in the case that the optical element has a principal transmittance k2 of 6% and a principal transmittance k1 of 80%.
Figure 11:
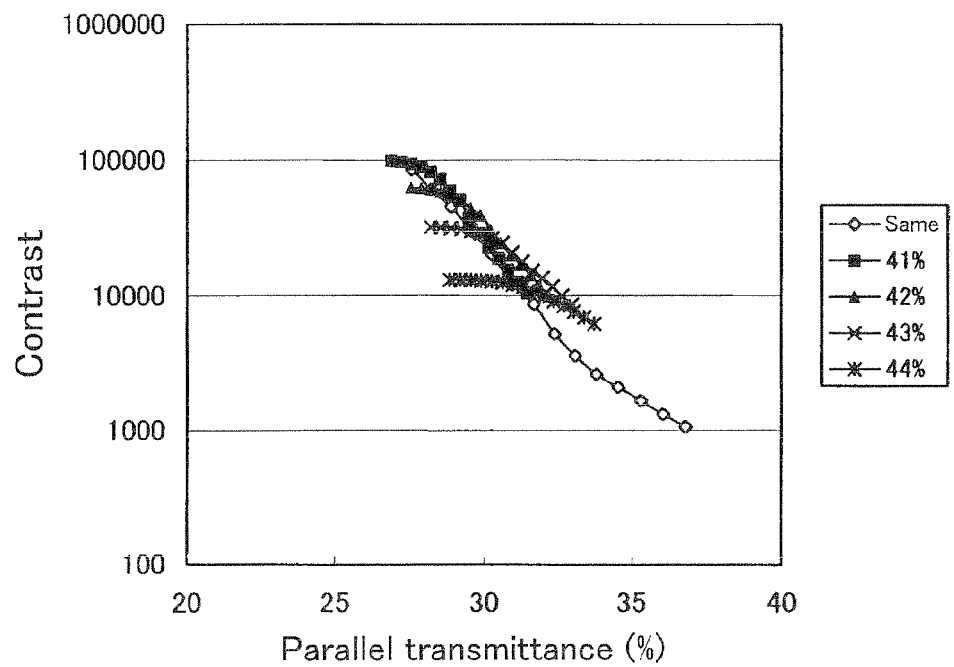
FIG. 11 is a graph that plots the white brightness and the contrast of the liquid crystal display in the case that the optical element has a principal transmittance k2 of 8% and a principal transmittance k1 of 80%.
Figure 12:
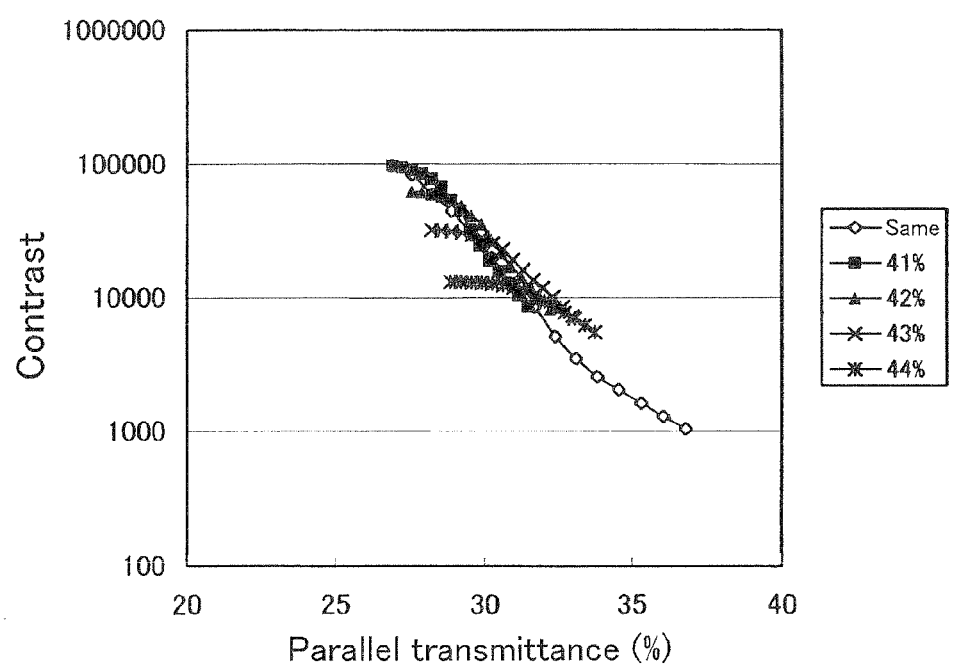
FIG. 12 is a graph that plots the white brightness and the contrast of the liquid crystal display in the case that the optical element has a principal transmittance k2 of 10% and a principal transmittance k1 of 80% (Comparative Example).
Figure 13:
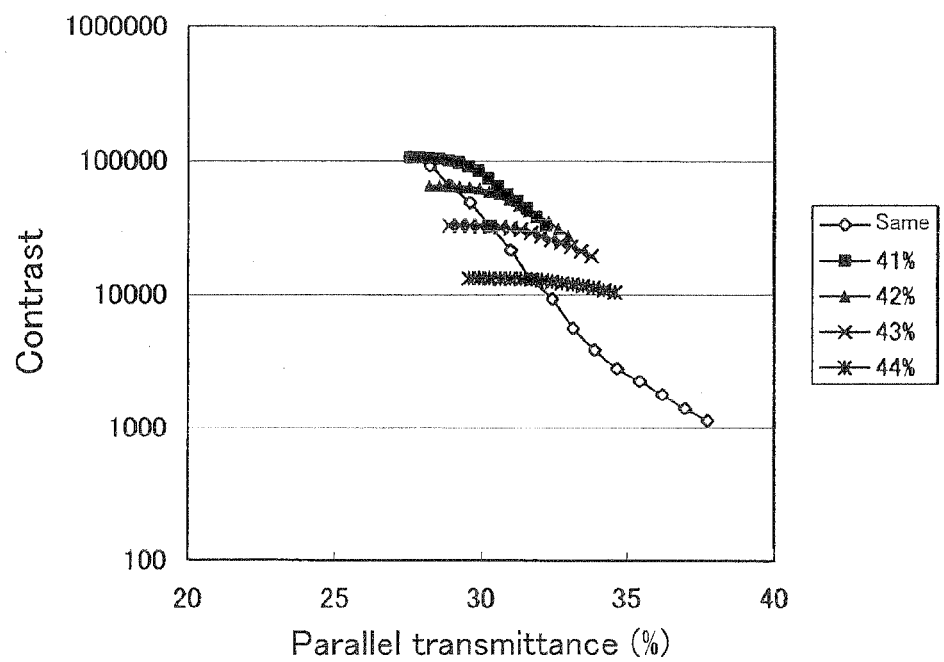
FIG. 13 is a graph that plots the white brightness and the contrast of the liquid crystal display in the case that the optical element has a principal transmittance k2 of 2% and a principal transmittance k1 of 82%.
Figure 14:
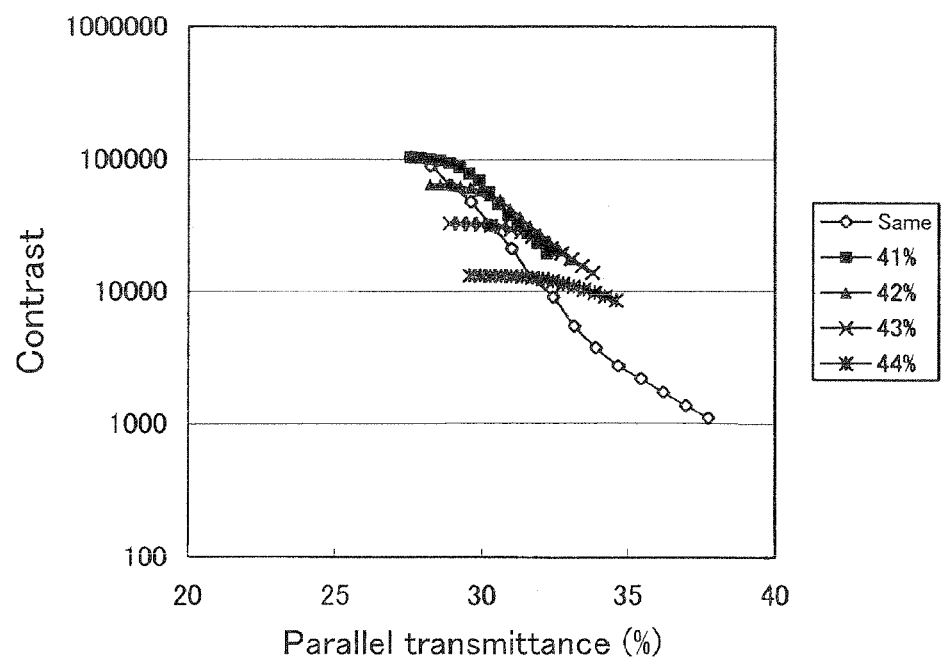
FIG. 14 is a graph that plots the white brightness and the contrast of the liquid crystal display in the case that the optical element has a principal transmittance k2 of 4% and a principal transmittance k1 of 82%.
Figure 15:
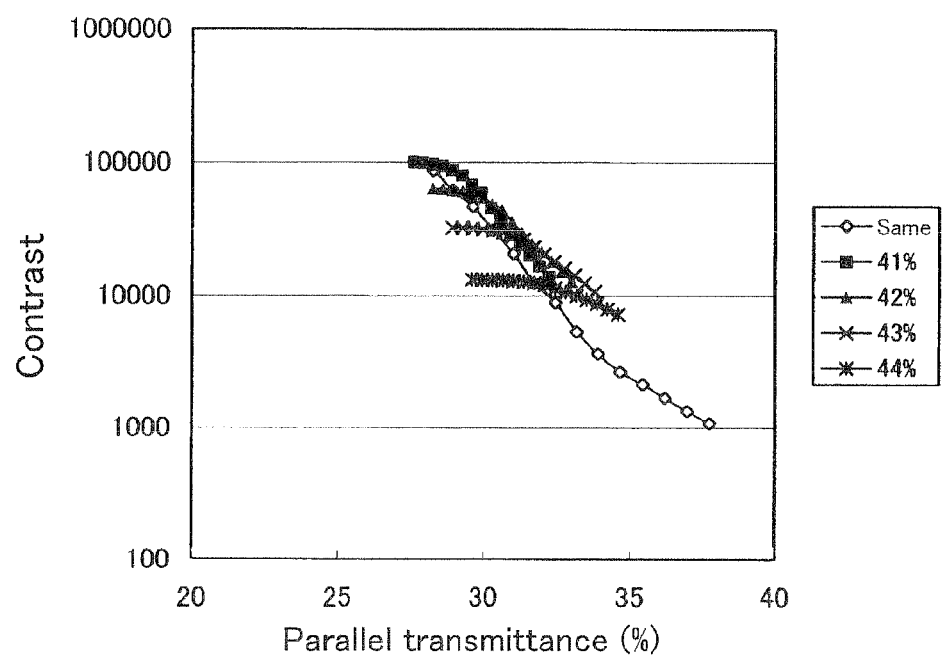
FIG. 15 is a graph that plots the white brightness and the contrast of the liquid crystal display in the case that the optical element has a principal transmittance k2 of 6% and a principal transmittance k1 of 82%.
Figure 16:
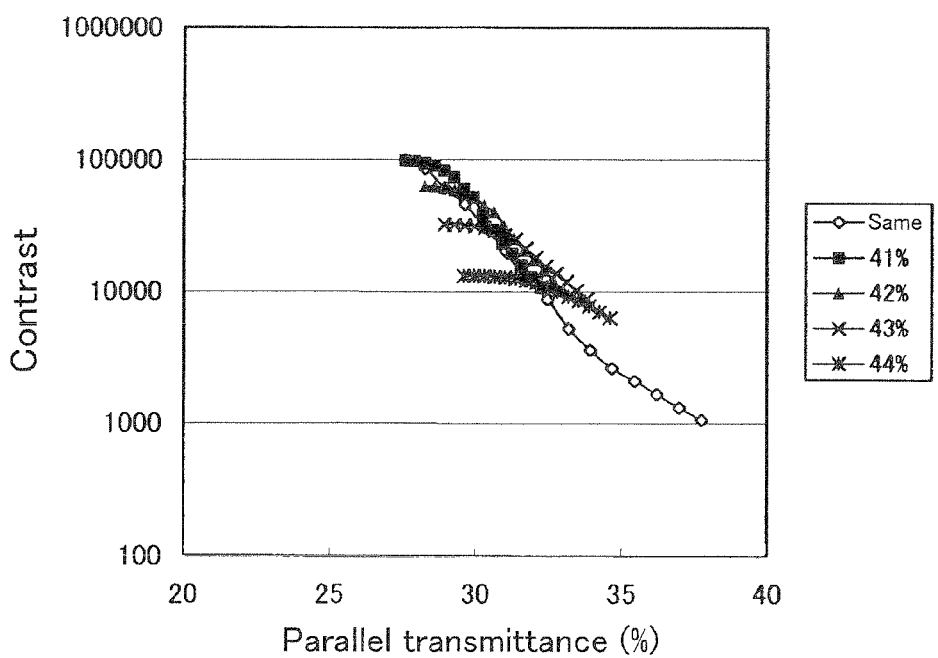
FIG. 16 is a graph that plots the white brightness and the contrast of the liquid crystal display in the case that the optical element has a principal transmittance k2 of 8% and a principal transmittance k1 of 82%.
Figure 17:
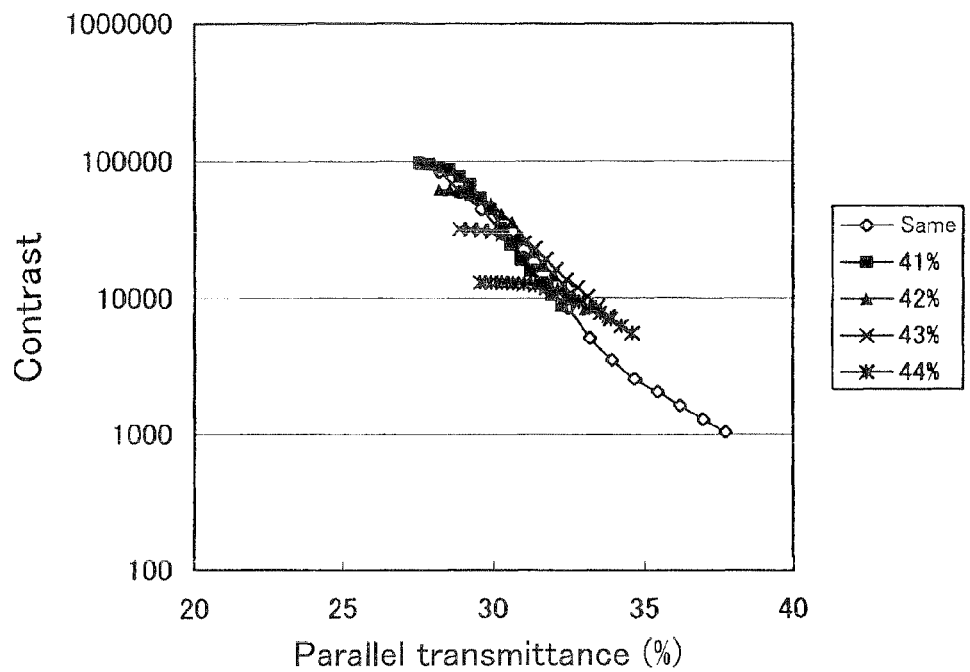
FIG. 17 is a graph that plots the white brightness and the contrast of the liquid crystal display in the case that the optical element has a principal transmittance k2 of 10% and a principal transmittance k1 of 82% (Comparative Example).
Figure 18:
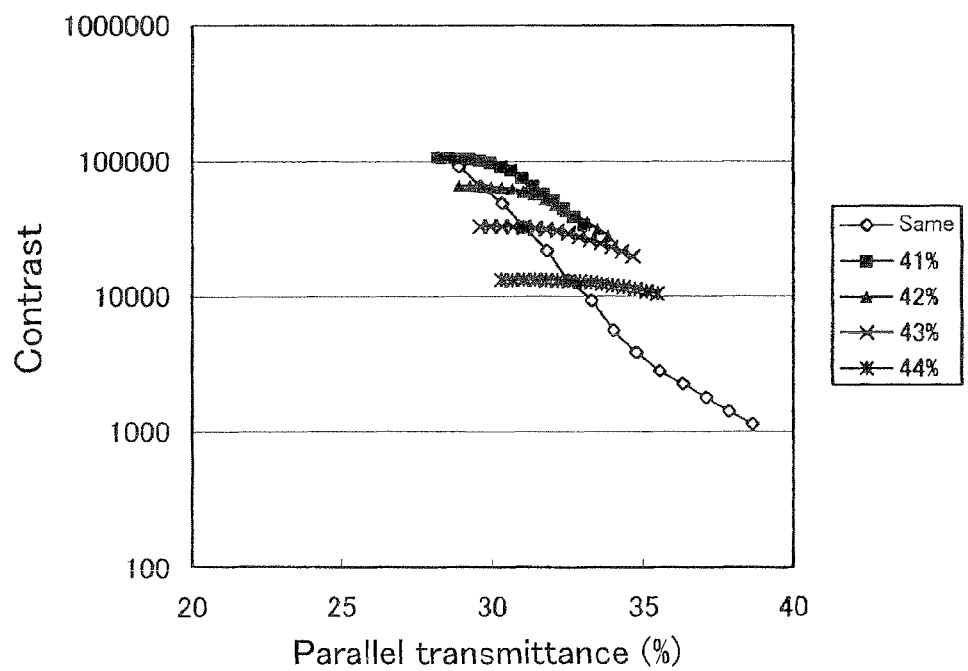
FIG. 18 is a graph that plots the white brightness and the contrast of the liquid crystal display in the case that the optical element has a principal transmittance k2 of 2% and a principal transmittance k1 of 84%.
Figure 19:
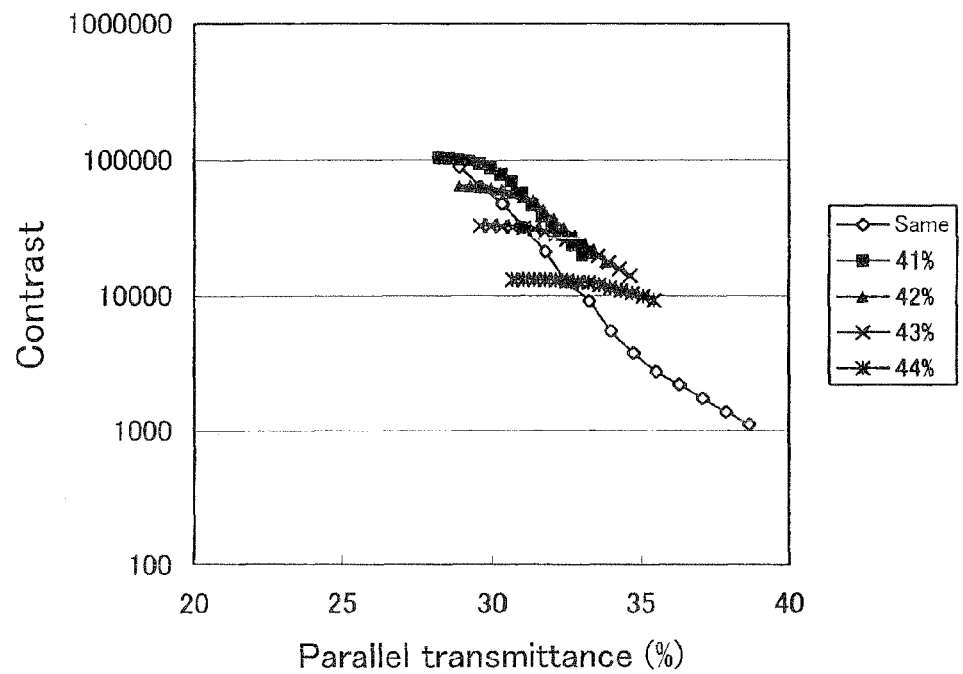
FIG. 19 is a graph that plots the white brightness and the contrast of the liquid crystal display in the case that the optical element has a principal transmittance k2 of 4% and a principal transmittance k1 of 84%.
Figure 20:
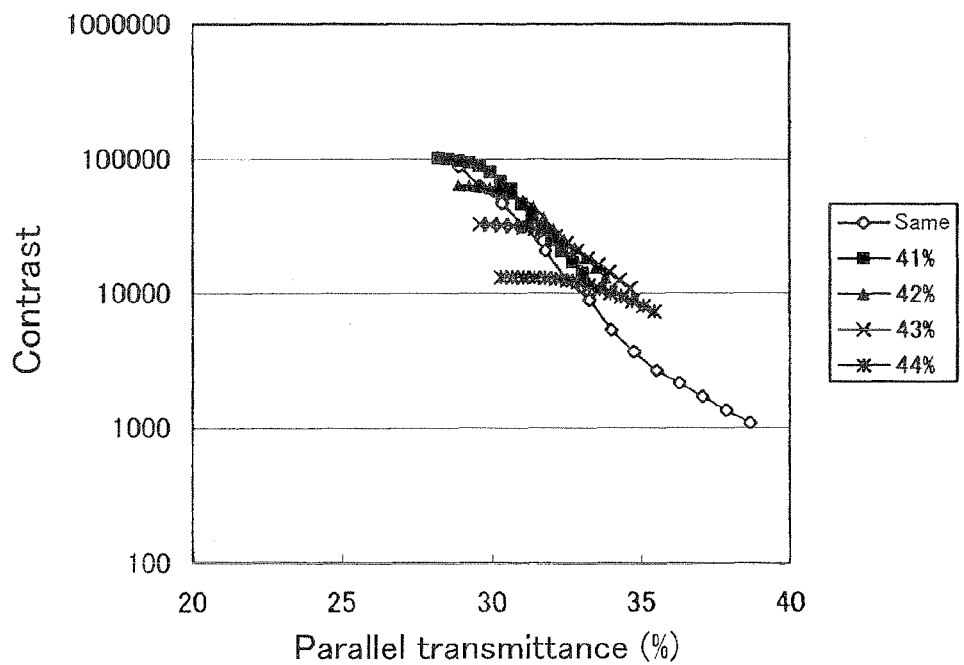
FIG. 20 is a graph that plots the white brightness and the contrast of the liquid crystal display in the case that the optical element has a principal transmittance k2 of 6% and a principal transmittance k1 of 84%.
Figure 21:
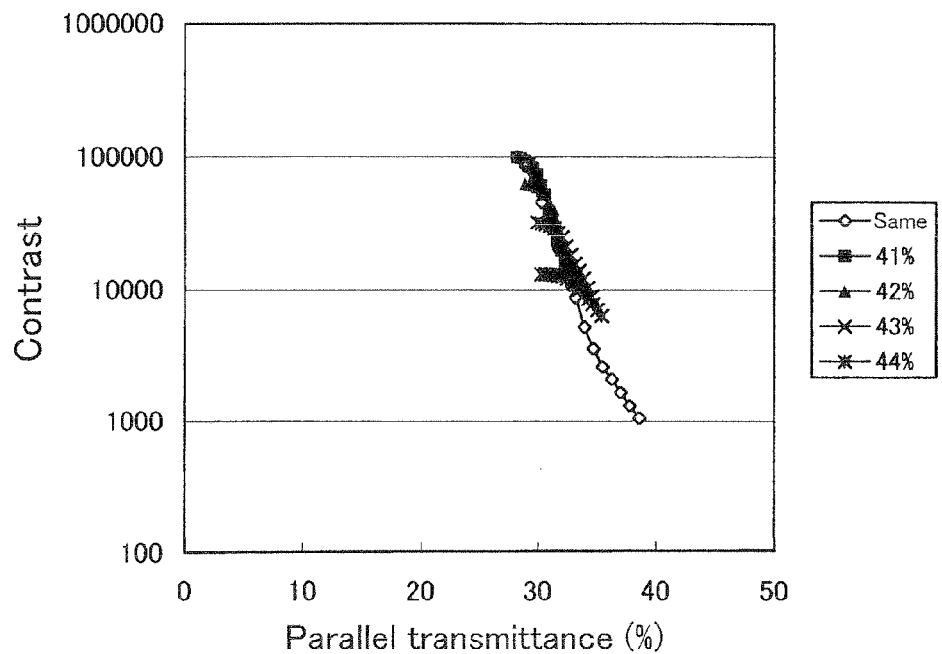
FIG. 21 is a graph that plots the white brightness and the contrast of the liquid crystal display in the case that the optical element has a principal transmittance k2 of 8% and a principal transmittance k1 of 84%.
Figure 22:
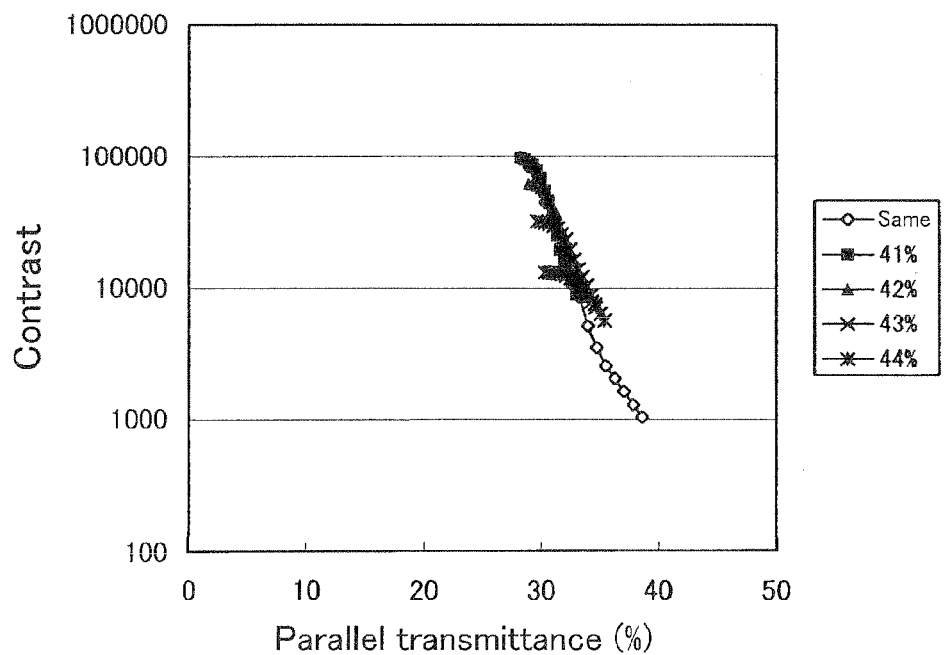
FIG. 22 is a graph that plots the white brightness and the contrast of the liquid crystal display in the case that the optical element has a principal transmittance k2 of 10% and a principal transmittance k1 of 84% (Comparative Example).
Figure 23:
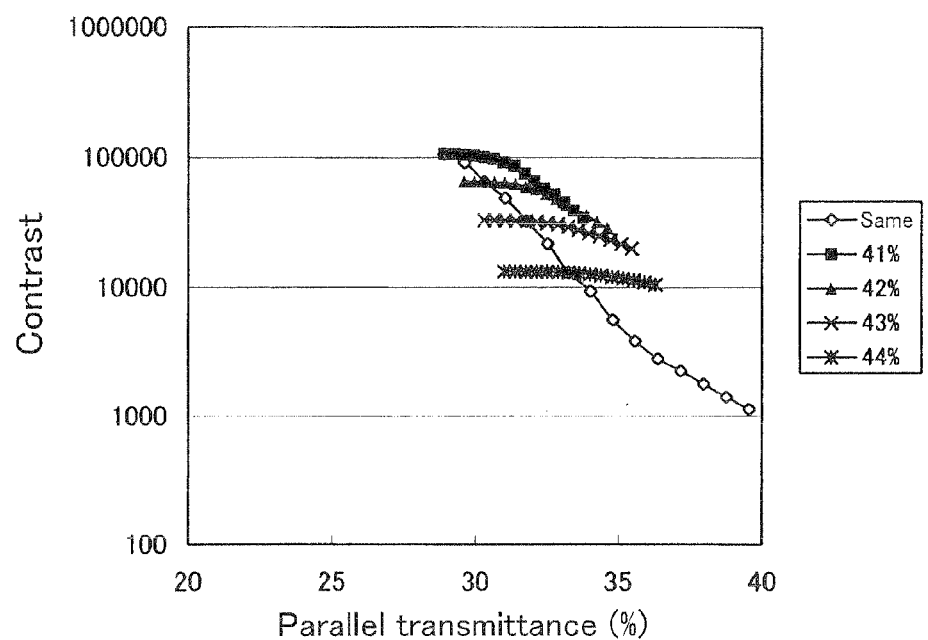
FIG. 23 is a graph that plots the white brightness and the contrast of the liquid crystal display in the case that the optical element has a principal transmittance k2 of 2% and a principal transmittance k1 of 86%.
Figure 24:
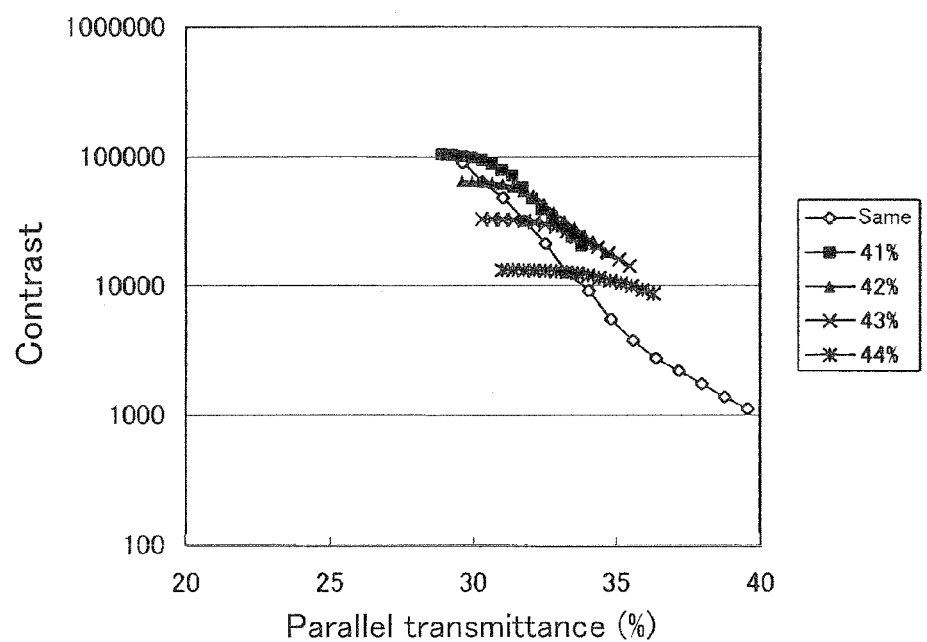
FIG. 24 is a graph that plots the white brightness and the contrast of the liquid crystal display in the case that the optical element has a principal transmittance k2 of 4% and a principal transmittance k1 of 86%.
Figure 25:
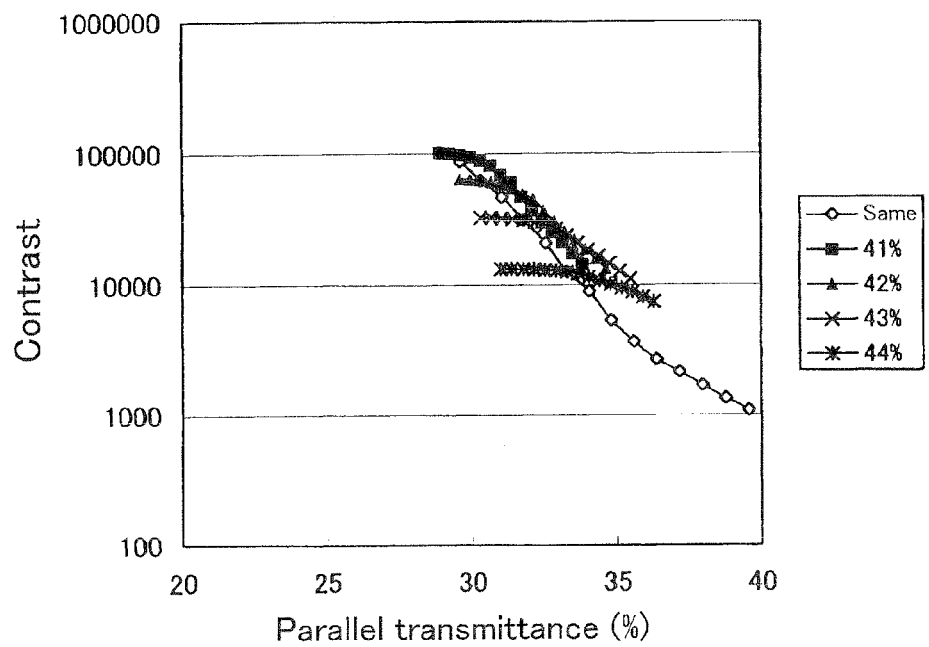
FIG. 25 is a graph that plots the white brightness and the contrast of the liquid crystal display in the case that the optical element has a principal transmittance k2 of 6% and a principal transmittance k1 of 86%.
Figure 26:
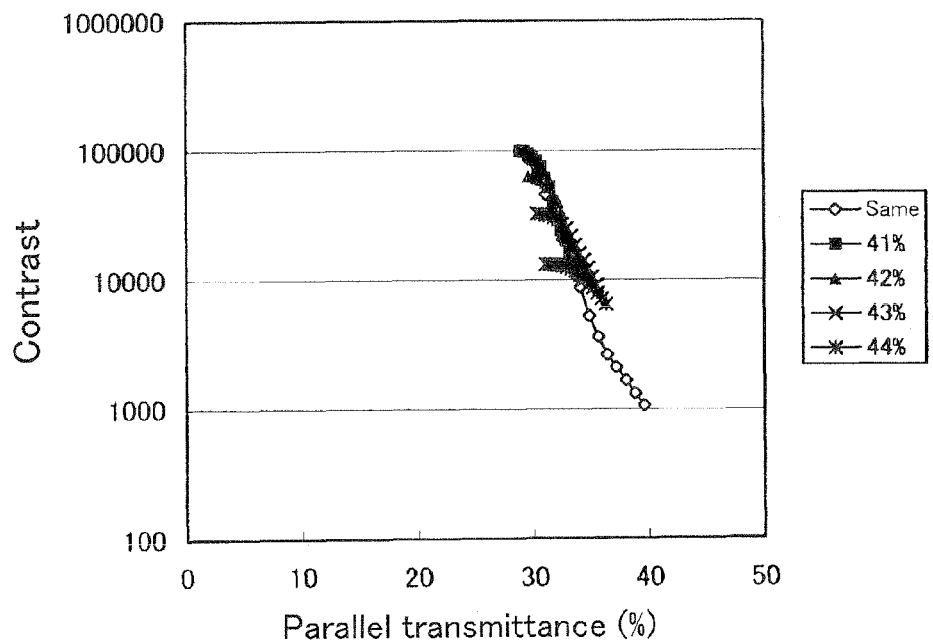
FIG. 26 is a graph that plots the white brightness and the contrast of the liquid crystal display in the case that the optical element has a principal transmittance k2 of 8% and a principal transmittance k1 of 86%.
Figure 27:
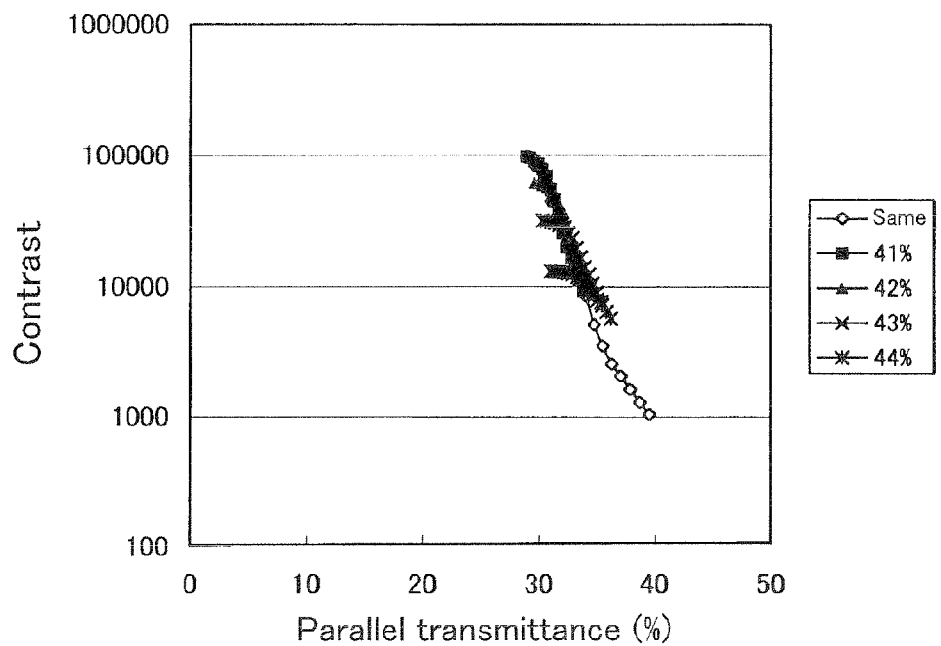
FIG. 27 is a graph that plots the white brightness and the contrast of the liquid crystal display in the case that the optical element has a principal transmittance k2 of 10% and a principal transmittance k1 of 86% (Comparative Example).

The white brightness and black brightness of the liquid crystal panel 10 are mainly determined based on the parallel transmittances and the cross transmittances of the front polarizing plate 12 and the back polarizing plate 13. Therefore, calculation of those transmittances enables estimation of the white brightness and black brightness of the liquid crystal panel 10. FIG. 2 are schematic views for explaining the methods of determining the white brightness and the black brightness in the liquid crystal display of Embodiment 1: FIG. 2(a) is for determining the white brightness; and FIG. 2(b) is for determining the black brightness.

The front white brightness of the liquid crystal display of the present embodiment corresponds to the parallel transmittance (white transmittance) calculated in the case that, as illustrated in FIG. 2(a), the front polarizing plate 12, the back polarizing plate 13, and the optical element 30 are arranged such that a transmission axis 12t of the front polarizing plate 12, a transmission axis 13t of the back polarizing plate 13, and a transmission axis 30t of the optical element 30 are parallel to each other.

Meanwhile, the front black brightness of the liquid crystal display of the present embodiment corresponds to the cross transmittance (black transmittance) calculated in the case that, as illustrated in FIG. 2(b), the back polarizing plate 13 and the optical element 30 are arranged such that the transmission axis 13t of the back polarizing plate 13 and the transmission axis 30t of the optical element 30 are parallel to each other, and the front polarizing plate 12 is arranged such that the transmission axis 12t of the front polarizing plate 12 is perpendicular to the transmission axis 13t of the back polarizing plate 13 and the transmission axis 30t of the optical element 30.

More specifically, the transmittances can be calculated by the following methods. Here, the parallel transmittance of the optical element 30 (which corresponds to the principal transmittance k1 of the optical element 30) is represented by k1a. The cross transmittance of the optical element 30 (which corresponds to the principal transmittance k2 of the optical element 30) is represented by k2a. The parallel transmittance of the back polarizing plate 13 (which corresponds to the principal transmittance k1 of the back polarizing plate 13) is represented by k1b. The cross transmittance of the back polarizing plate 13 (which corresponds to the principal transmittance k2 of the back polarizing plate 13) is represented by k2b. The parallel transmittance of the front polarizing plate 12 (which corresponds to the principal transmittance k1 of the front polarizing plate 12) is represented by k1c. The cross transmittance of the front polarizing plate 12 (which corresponds to the principal transmittance k2 of the front polarizing plate 12) is represented by k2c. The amount of natural light (the total amount of light which enters into the optical element 30) is set to 1.

The liquid crystal display of the present embodiment has three optical components providing a polarizing effect, the transmission axes of which are parallel to each other. The front white brightness of this liquid crystal display can be determined in the following way. First, the amount of natural light is divided into two perpendicular polarization components. Next, each polarization component, in an amount half the above amount of light, is multiplied by values of k1 and k2 of the respective optical components. Lastly, the resulting values are summed so that the parallel transmittance (white transmittance) can be calculated (see the following formula (1)).

$$\text{Parallel transmittance (white transmittance)} = (k1a \times k1b \times k1c)/2 + (k2a \times k2b \times k2c)/2 \quad (1)$$

In the meantime, the cross transmittance (black transmittance) corresponding to the front black brightness of the liquid crystal display of the present embodiment can be calculated by replacing k1c and k2c in the calculation of the parallel transmittance (white transmittance) because only the transmission axis 12t of the front polarizing plate 12 is perpendicular to the other transmission axes (see following formula (2)).

$$\text{Cross transmittance (black transmittance)} = (k1a \times k1b \times k2c)/2 + (k2a \times k2b \times k1c)/2 \quad (2)$$

Table 1 shows respective parameters of the front polarizing plate 12 and the back polarizing plate 13 used for the present simulation. Table 2 shows respective parameters of the optical element 30 used for the present simulation. As shown in Table 2, in the present simulation, calculations were made for the cases in which the principal transmittance k1 of the optical element 30 was 78%, 80%, 82%, 84%, and 86%, and the principal transmittance k2 was 2%, 4%, 6%, 8%, and 10%. The case of the principal transmittance k1 of the optical element 30 being 78% and the case of the principal transmittance k2 being 10% correspond to Comparative Examples of the present invention.

TABLE 1

|  | k1 | k2 | Single transmittance (%) | Parallel transmittance (%) | Cross transmittance (%) | CR | Degree of polarization (%) |
| --- | --- | --- | --- | --- | --- | --- | --- |
| P(48) | 96 | 0.0826 | 48 | 46.0 | 0.079 | 581 | 99.828 |
| P(47.5) | 95 | 0.0660 | 47.5 | 45.1 | 0.063 | 719 | 99.861 |
| P(47) | 94 | 0.0517 | 47 | 44.1 | 0.049 | 909 | 99.89 |
| P(46.5) | 93 | 0.0405 | 46.5 | 43.2 | 0.038 | 1149 | 99.913 |
| P(46) | 92 | 0.0322 | 46 | 42.3 | 0.030 | 1428 | 99.93 |
| P(45.5) | 91 | 0.0232 | 45.5 | 41.4 | 0.021 | 1960 | 99.949 |
| P(45) | 90 | 0.0158 | 45 | 40.5 | 0.014 | 2857 | 99.965 |
| P(44.5) | 89 | 0.0093 | 44.5 | 39.6 | 0.008 | 4761 | 99.979 |
| P(44) | 88 | 0.0066 | 44 | 38.7 | 0.006 | 6666 | 99.985 |
| P(43.5) | 87 | 0.0039 | 43.5 | 37.8 | 0.003 | 11111 | 99.991 |
| P(43) | 86 | 0.0026 | 43 | 37.0 | 0.002 | 16666 | 99.994 |
| P(42.5) | 85 | 0.0017 | 42.5 | 36.1 | 0.001 | 25000 | 99.996 |
| P(42) | 84 | 0.0013 | 42 | 35.3 | 0.001 | 33333 | 99.997 |
| P(41.5) | 83 | 0.0009 | 41.5 | 34.4 | 0.001 | 46728 | 99.998 |
| P(41) | 82 | 0.0008 | 41 | 33.6 | 0.001 | 54347 | 99.998 |

TABLE 2

|  | k1 | k2 | Single transmittance (%) | Parallel transmittance (%) | Cross transmittance (%) | CR | Degree of polarization (%) |
|---|---|---|---|---|---|---|---|
| Comparative Example 1 | 78 | 2 | 40.0 | 30.4 | 1.6 | 19.5 | 95.000 |
| Comparative Example 2 | 78 | 4 | 41.0 | 30.5 | 3.1 | 9.8 | 90.244 |
| Comparative Example 3 | 78 | 6 | 42.0 | 30.6 | 4.7 | 6.5 | 85.714 |
| Comparative Example 4 | 78 | 8 | 43.0 | 30.7 | 6.2 | 4.9 | 81.395 |
| Comparative Example 5 | 78 | 10 | 44.0 | 30.9 | 7.8 | 4.0 | 77.273 |
| Example 1 | 80 | 2 | 41.0 | 32.0 | 1.6 | 20.0 | 95.122 |
| Example 2 | 80 | 4 | 42.0 | 32.1 | 3.2 | 10.0 | 90.476 |
| Example 3 | 80 | 6 | 43.0 | 32.2 | 4.8 | 6.7 | 86.047 |
| Example 4 | 80 | 8 | 44.0 | 32.3 | 6.4 | 5.1 | 81.818 |
| Comparative Example 7 | 80 | 10 | 45.0 | 32.5 | 8.0 | 4.1 | 77.778 |
| Example 5 | 82 | 2 | 42.0 | 33.6 | 1.6 | 20.5 | 95.238 |
| Example 6 | 82 | 4 | 43.0 | 33.7 | 3.3 | 10.3 | 90.698 |
| Example 7 | 82 | 6 | 44.0 | 33.8 | 4.9 | 6.9 | 86.364 |
| Example 8 | 82 | 8 | 45.0 | 33.9 | 6.6 | 5.2 | 82.222 |
| Comparative Example 8 | 82 | 10 | 46.0 | 34.1 | 8.2 | 4.2 | 78.261 |
| Example 9 | 84 | 2 | 43.0 | 35.3 | 1.7 | 21.0 | 95.349 |
| Example 10 | 84 | 4 | 44.0 | 35.4 | 3.4 | 10.5 | 90.909 |
| Example 11 | 84 | 6 | 45.0 | 35.5 | 5.0 | 7.0 | 86.667 |
| Example 12 | 84 | 8 | 46.0 | 35.6 | 6.7 | 5.3 | 82.609 |
| Comparative Example 9 | 84 | 10 | 47.0 | 35.8 | 8.4 | 4.3 | 78.723 |
| Example 13 | 86 | 2 | 44.0 | 37.0 | 1.7 | 21.5 | 95.455 |
| Example 14 | 86 | 4 | 45.0 | 37.1 | 3.4 | 10.8 | 91.111 |
| Example 15 | 86 | 6 | 46.0 | 37.2 | 5.2 | 7.2 | 86.957 |
| Example 16 | 86 | 8 | 47.0 | 37.3 | 6.9 | 5.4 | 82.979 |
| Comparative Example 10 | 86 | 10 | 48.0 | 37.5 | 8.6 | 4.4 | 79.167 |

FIGS. 3 to 27 are graphs each plotting the white brightness and the contrast of the liquid crystal display which were determined in the present simulation. In FIGS. 3 to 27, the horizontal axis shows the parallel transmittance (white transmittance) in the case that the natural light (backlight) is taken as 100%, and the transmission axes of the optical element 30, the back polarizing plate 13, and the front polarizing plate 12 were parallel to each other. The horizontal axis corresponds to the white brightness of the liquid crystal display. In FIGS. 3 to 27, the vertical axis corresponds to the value determined by dividing the parallel transmittance (white transmittance), shown by the horizontal axis, by the cross transmittance (black transmittance) in the case that transmission axes of the optical element 30 and the back polarizing plate 13 were parallel to each other and the transmission axis of the back polarizing plate 13 and the transmission axis of the front polarizing plate 12 were perpendicular to each other. That is, the vertical axis corresponds to the contrast (CR) of the liquid crystal display. In FIGS. 3 to 27, the series described as "same" indicates the case that polarizing plates having the same single transmittance (41 to 48% in Table 1) were used for the back polarizing plate 13 and the front polarizing plate 12, and this series corresponds to Comparative Example of the present invention. In FIGS. 3 to 27, series other than the series described as "same" indicate the case that the single transmittance of the front polarizing plate 12 was fixed to a numerical value shown in the legend (that is, the single transmittance of the front polarizing plate 12 was fixed to P(41), P(42), P(43), or P(44) in Table 1), and the single transmittance of the back polarizing plate 13 was changed from 41% to 48% in Table 1 (that is, the single transmittance of the back polarizing plate 13 was set to P(41), P(41.5), P(42), P(42.5), P(43), P(43.5), P(44), P(44.5), P(45), P(45.5), P(46), P(46.5), P(47), P(47.5), or P(48)).

In FIGS. 3 to 27, all the series show the change that the white brightness increases (points shift from the left to the right in the graph) as the transmittance increases. Therefore, for series other than the series described as "same" in FIGS. 3 to 27, the points, located in the region (region on the right of the points of the series indicated as "same" in each graph) in which the white brightness is higher than the point overlapping a point of the series indicated as "same", are the calculation results of the case in which the contrast of the back polarizing plate 13 was lower than the contrast of the front polarizing plate 12 and the transmittance of the back polarizing plate 13 was higher than the transmittance of the front polarizing plate 12. That is, such a series corresponds to Example of the present invention.

The results of the present simulation revealed, as shown in FIGS. 8 to 11, FIGS. 13 to 16, FIGS. 18 to 21, and FIGS. 23 to 26, that the front white brightness can be enhanced while the contrast (front contrast ratio) of the liquid crystal display is maintained at the same level, when the principal transmittance k1 of the optical element 30 is 80 to 86% and the principal transmittance k2 is 2 to 8%. In FIGS. 8 to 11, FIGS. 13 to 16, FIGS. 18 to 21, and FIGS. 23 to 26, there are series (other than the series described as "same") showing a higher transmittance of the back polarizing plate 13 than the transmittance of the front polarizing plate 12 (such a series corresponds to Example of the present invention). Those series showed better contrast and front white brightness than the series described as "same" (the series corresponds to Comparative Example of the present invention) in FIGS. 8 to 11, FIGS. 13 to 16, FIGS. 18 to 21, and FIGS. 23 to 26.

In contrast, as shown in FIGS. 3 to 6, when the principal transmittance k1 of the optical element 30 was set to 78%, the series seemed to move similarly to the series corresponding to Examples of the present invention. However, the white brightness as a liquid crystal display decreased, which means that the aim of the present invention, provision of both sufficient front white brightness and sufficient front contrast ratio, was not sufficiently achieved. In the case that the principal transmittance k2 of the optical element 30 was set to 10% as shown in FIG. 12, FIG. 17, FIG. 22, and FIG. 27, the front white brightness was hardly enhanced even when a polarizing plate having a low transmittance and a high contrast was used as the front polarizing plate 12 and a polarizing plate having a high transmittance and a low contrast was used as the back polarizing plate 13.

Example 17

Figure 28:
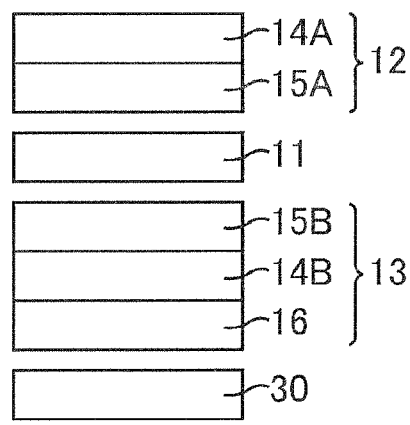
FIG. 28 is a schematic cross-sectional view of the liquid crystal display of Example 17.

The liquid crystal display of Example 17 has a structure in which the optical element 30, the back polarizing plate 13, the liquid crystal cell 11, and the front polarizing plate 12 are laminated in this order from the backlight side, as illustrated in FIG. 28.

The front polarizing plate 12 has a structure in which a retardation film 15A and a polarizer 14A with a low transmittance are laminated in this order from the liquid crystal cell 11 side.

The back polarizing plate 13 has a structure in which a negative C plate 16 produced from TAC or the like, a polarizer 14B with a high transmittance, and a retardation film 15B are laminated in this order from the optical element 30 side.

In the present Example, the liquid crystal cell 11 has a homeotropic alignment (vertical alignment), and shows an index ellipsoid with the relation nz>nx=ny. Further, Rth[550] of the liquid crystal cell 11 in the present Example was set to 325 nm.

Each parameter of the polarizer 14A and the polarizer 14B in the present Example is shown in the following Table 3. The polarizer 14A and the polarizer 14B were arranged in crossed Nicols such that their absorption axes would be perpendicular to each other. The polarizer 14B and the optical element 30 were arranged in parallel Nicols such that their absorption axes would be parallel to each other.

TABLE 3

|  | k1 | k2 | Single transmittance (%) | Parallel transmittance (%) | Cross transmittance (%) | CR | Degree of polarization (%) |
|---|---|---|---|---|---|---|---|
| Polarizer 14A with low transmittance | 87.9 | 0.0019 | 43.9 | 38.6 | 0.0016 | 23732 | 99.992 |
| Polarizer 14B with high transmittance | 90.2 | 0.0161 | 45.1 | 40.7 | 0.0146 | 2792 | 99.928 |

In the present Example, each parameter of the optical element 30 is shown in the following Table 4.

TABLE 4

|  | k1 | k2 | Single transmittance (%) | Parallel transmittance (%) | Cross transmittance (%) | CR | Degree of polarization (%) |
|---|---|---|---|---|---|---|---|
| Optical element 30 providing polarizing effect | 86 | 2.3 | 44.2 | 37.0 | 2.0 | 18.2 | 94.73 |

The retardation films 15A and 15B were biaxial retardation films which satisfy the relation nx>ny>nz, and Re[550] was set to 50 nm and Rth[550] was set to 135 nm.

The negative C plate 16 was a uniaxial retardation film which satisfies the relation nx=ny>nz, and Rth[550] was set to 60 nm.

The angle (angle formed in a plane view) formed by the slow axis of the retardation film 15A and the absorption axis of the polarizer 14A was set to 90°. Meanwhile, the angle (angle seen in a plan view) formed by the slow axis of the retardation film 15B and the absorption axis of the polarizer 14B was changed from 90° to 89° by 0.1° in arrangement.

Comparative Example 11

Figure 29:
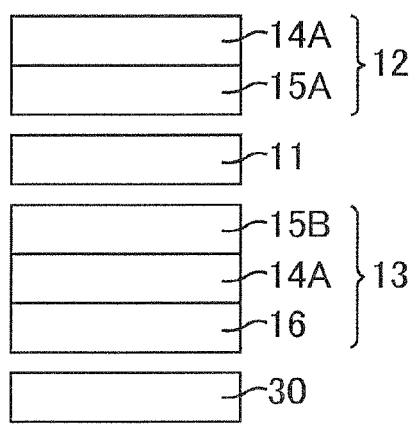
FIG. 29 is a schematic cross-sectional view of the liquid crystal display of Comparative Example 11.

The liquid crystal display of Comparative Example 11 has the same configuration as that of the liquid crystal display of Example 17, except that the front polarizing plate 12 and the back polarizing plate 13 both had the polarizer 14A with a low transmittance, as illustrated in FIG. 29.

Comparative Example 12

Figure 30:
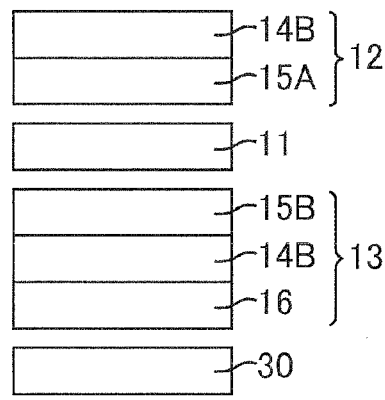
FIG. 30 is a schematic cross-sectional view of the liquid crystal display of Comparative Example 12.

The liquid crystal display of Comparative Example 12 has the same configuration as the liquid crystal display of Example 17, except that the front polarizing plate 12 and the back polarizing plate 13 both had the polarizer 143 with a high transmittance, as illustrated in FIG. 30.

(Oblique Contrast)

Figure 31:
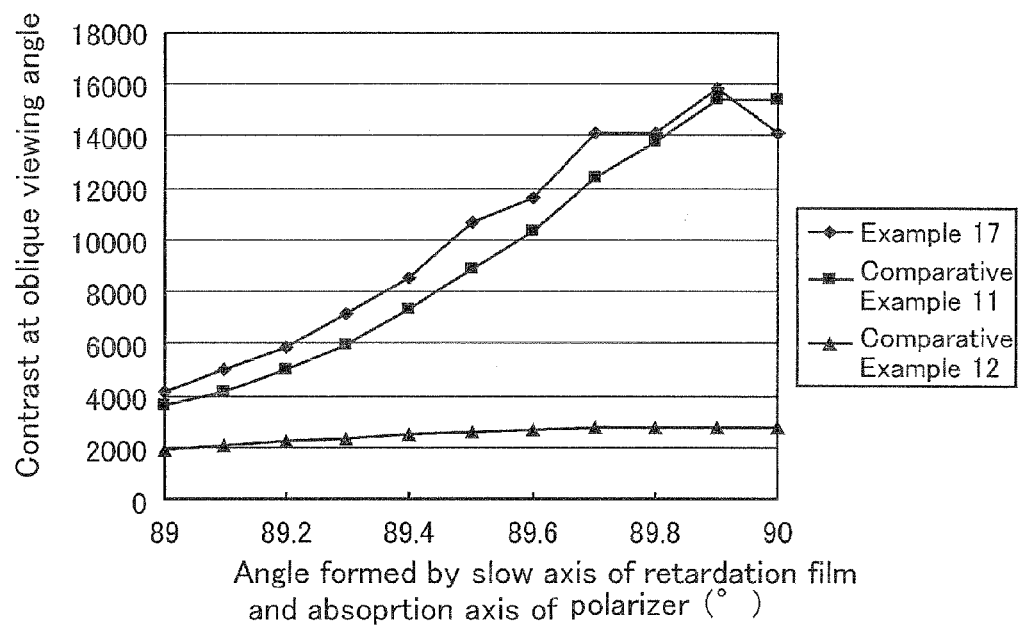
FIG. 31 is a graph that plots the contrasts in oblique viewing angles in the liquid crystal displays of Embodiment 17, Comparative Example 11, and Comparative Example 12.

The contrast of the liquid crystal display when observed from an oblique viewing angle was simulated for Example 17 and Comparative Examples 11 and 12. The observation from an oblique viewing angle is observation from the direction that bisects the absorption axes of the polarizers 14A and 14B, and that is 60° off the normal direction of the display surface. As a result, the contrast increased when the angle formed by the slow axis of the retardation film 15B and the absorption axis of the polarizer 14B in Example 17 was slightly different from 90°, as illustrated FIG. 31.

Also, the contrast in Example 17 was maintained to be higher than those in Comparative Examples 11 and 12 even when the angle formed by the slow axis of the retardation film 15B and the absorption axis of the polarizer 14B was largely different from 90°.

Further, actually produced liquid crystal displays having respective configurations of Examples 17 and Comparative Examples 11 and 12 were visually observed from an oblique viewing angle. In the observation, the liquid crystal display of Example 17 showed a better contrast than that of the liquid crystal displays of Comparative Examples 11 and 12.

The present application claims priority to Patent Application No. 2009-034405 filed in Japan on Feb. 17, 2009 under the Paris Convention and provisions of national law in a designated State, the entire contents of which are hereby incorporated by reference.

EXPLANATION OF NUMERALS AND SYMBOLS

10: Liquid crystal panel
11: Liquid crystal cell
12: Front polarizing plate
13: Back polarizing plate
14A, 14B: Polarizer
15A, 15B: Retardation film
16: Negative C plate
20: Backlight
21: Cold cathode tube
22: Case
23: Diffuser
24: Optical sheet
30: Optical Element providing a polarizing effect

The invention claimed is:

1. A liquid crystal display comprising:
   a front polarizing plate;
   a liquid crystal cell;
   a back polarizing plate; and
   an optical element providing a polarizing effect, the components being arranged in the stated order, wherein the back polarizing plate has a higher transmittance than the front polarizing plate, the back polarizing plate has a lower contrast than the front polarizing plate, and
   the optical element providing a polarizing effect has a principal transmittance k1 of 80 to 86%, and a principal transmittance k2 of 2 to 8%.

2. The liquid crystal display according to claim 1, wherein at least one of the front polarizing plate and the back polarizing plate has a retardation layer on the liquid crystal cell side.

3. The liquid crystal display according to claim 2, wherein the retardation layer is a retardation film showing an index ellipsoid that satisfies nx≧ny>nz.

4. The liquid crystal display according to claim 1, wherein the liquid crystal cell has a liquid crystal layer containing liquid crystal molecules that are arranged in a homeotropic alignment in a state with no electric field.

5. The liquid crystal display according to claim 1, wherein the back polarizing plate has a retardation layer on the liquid crystal cell side, and
   the liquid crystal cell has a liquid crystal layer containing liquid crystal molecules that are arranged in a homeotropic alignment in a state with no electric field.

6. The liquid crystal display according to claim 5, wherein the back polarizing plate has a negative C plate on the side of the optical element providing a polarizing effect.

7. The liquid crystal display according to claim 1, wherein the optical element providing a polarizing effect has a principal transmittance k1 of 82 to 84%.

8. The liquid crystal display according to claim 1, wherein the optical element providing a polarizing effect has a principal transmittance k2 of 2 to 6%.

9. The liquid crystal display according to claim 1, wherein the front polarizing plate has a transmittance of 40 to 45%.

10. The liquid crystal display according to claim 1, wherein the front polarizing plate has a transmittance of 42 to 44%.

11. The liquid crystal display according to claim 1, wherein the back polarizing plate has a transmittance of 42 to 48%.

12. The liquid crystal display according to claim 1, wherein the back polarizing plate has a transmittance of 43 to 46%.

13. The liquid crystal display according to claim 1, wherein the optical element providing a polarizing effect is a brightness enhancing film or a wire grid polarizer.

* * * * *